US008340437B2

(12) United States Patent
Abràmoff et al.

(10) Patent No.: US 8,340,437 B2
(45) Date of Patent: Dec. 25, 2012

(54) METHODS AND SYSTEMS FOR DETERMINING OPTIMAL FEATURES FOR CLASSIFYING PATTERNS OR OBJECTS IN IMAGES

(75) Inventors: Michael Abràmoff, Iowa City, IA (US);
Pete Soliz, Albuquerque, NM (US);
Stephen Russell, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 472 days.

(21) Appl. No.: 12/601,784

(22) PCT Filed: May 29, 2008

(86) PCT No.: PCT/US2008/065043
§ 371 (c)(1),
(2), (4) Date: Mar. 31, 2010

(87) PCT Pub. No.: WO2008/150840
PCT Pub. Date: Dec. 11, 2008

(65) Prior Publication Data
US 2010/0220906 A1    Sep. 2, 2010

Related U.S. Application Data

(60) Provisional application No. 60/940,603, filed on May 29, 2007.

(51) Int. Cl.
*G06K 9/00* (2006.01)
*G06K 9/46* (2006.01)

(52) U.S. Cl. ............ 382/224; 382/165; 382/190
(58) Field of Classification Search ........ 382/118, 382/130, 133, 154, 165, 190, 274, 224, 227, 382/159, 225; 600/440, 508, 408, 411, 427; 435/7.25; 700/47, 50; 706/15, 19, 20, 22, 706/41; 707/E17.02
See application file for complete search history.

(56) References Cited

U.S. PATENT DOCUMENTS

| | | | |
|---|---|---|---|
| 7,242,810 B2* | 7/2007 | Chang | 382/227 |
| 7,474,775 B2 | 1/2009 | Abramoff et al. | |
| 7,712,898 B2 | 5/2010 | Abramoff et al. | |
| 7,715,597 B2* | 5/2010 | Costache et al. | 382/118 |
| 8,140,329 B2* | 3/2012 | Zhang et al. | 704/237 |
| 2007/0183661 A1* | 8/2007 | El-Maleh et al. | 382/173 |
| 2010/0061601 A1 | 3/2010 | Abramoff et al. | |

FOREIGN PATENT DOCUMENTS

| | | |
|---|---|---|
| CA | 2610345 | 12/2006 |
| WO | WO 89/05493 | 6/1989 |

(Continued)

OTHER PUBLICATIONS

International Preliminary Report on Patentability and Written Opinion issued Dec. 1, 2009 for International Application No. PCT/US2008/065043 (which published as WO 2008/150840 on Dec. 11, 2008).

(Continued)

*Primary Examiner* — Sheela Chawan
(74) *Attorney, Agent, or Firm* — Ballard Spahr LLP

(57) ABSTRACT

Provided are methods for determining optimal features for classifying patterns or objects. Also provided are methods for image analysis. Further provided are methods for image searching.

63 Claims, 15 Drawing Sheets

FOREIGN PATENT DOCUMENTS

| WO | WO 2005/076198 | 8/2005 |
|---|---|---|
| WO | WO 2006/105473 | 10/2006 |
| WO | WO 2007/031818 | 3/2007 |
| WO | WO 2007/118079 | 10/2007 |
| WO | WO 2008/150840 | 12/2008 |

OTHER PUBLICATIONS

International Search Report issued Oct. 15, 2008 for International Application No. PCT/US2008/065043 (which published as WO 2008/150840 on Dec. 11, 2008).
B. ter Haar Romeny, Front-End Vision and Multi-Scale Image Analysis, Springer: 2003, pp. xiii-xviii.
Hyvärinen A, Oja E. (2000) Independent component analysis: algorithms and applications. Neural Netw. 13(4-5): 411-430.
U.S. Appl. No. 11/392,268, filed Mar. 29, 2006, Abramoff et al.
U.S. Appl. No. 11/695,779, filed Apr. 3, 2007, Abramoff et al.
U.S. Appl. No. 12/387,071, filed Apr. 27, 2009, Abramoff et al.
PCT/US2006/012191, Mar. 31, 2006, Abramoff et al. / University of Iowa Research Foundation.
PCT/US2007/065862, Apr. 3, 2007, Abramoff et al. / University of Iowa Research Foundation.
PCT/US2010/025369, Feb. 25, 2010, Abramoff et al. / University of Iowa Research Foundation.
International Search Report issued Jan. 3, 2008 for International Application No. PCT/US2006/012191 (which published as WO 2006/105473 on Oct. 5, 2006).
International Preliminary Report on Patentability with Written Opinion issued Mar. 10, 2009 for International Application No. PCT/US2006/012191 (which published as WO 2006/105473 on Oct. 5, 2006).
International Search Report issued Oct. 15, 2008 for International Application No. PCT/US2008/065043 (which published as WO2008/150840 on Dec. 11, 2008).
International Preliminary Report on Patentability with Written Opinion issued Dec. 1, 2009 for International Application No. PCT/US2008/065043 (which published as WO2008/150840 on Dec. 11, 2008).
International Search Report issued Sep. 17, 2008 for International Application No. PCT/US2007/065862 (which published as WO2007/118079 on Oct. 18, 2007).
International Preliminary Report on Patentability with Written Opinion issued Nov. 4, 2008 for for International Application No. PCT/US2007/065862 (which published as WO2007/118079 on Oct. 18, 2007).

* cited by examiner

FIG. 11

| AMD | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Stargardts | 1 | 4 | 15 | 3 | 11 | 6 | 5 | 2 | 31 | 8 | 12 | 9 | 10 | 2 | 17 | 7 |
| x-corr: | 0.90 | 0.92 | 0.87 | 0.93 | 0.90 | 0.87 | 0.95 | 0.73 | 0.94 | 0.73 | 0.86 | 0.94 | 0.63 | 0.94 | 0.83 | 0.84 |
| AMD | 17 | 18 | 19 | 20 | 21 | 22 | 23 | 24 | 25 | 26 | 27 | 28 | 29 | 30 | 31 | 32 |
| Stargardts | 18 | 25 | 14 | 22 | 21 | 27 | 28 | 26 | 30 | 16 | 23 | 19 | 20 | 26 | 13 | 24 |
| x-corr: | 0.86 | 0.88 | 0.75 | 0.88 | 0.81 | 0.91 | 0.94 | 0.38 | 0.92 | 0.89 | 0.91 | 0.55 | 0.63 | 0.83 | 0.81 | 0.93 |

1101
1102

FIG. 14A
FIG. 14B
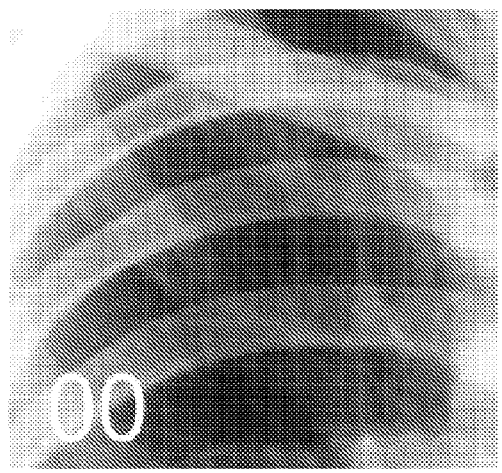
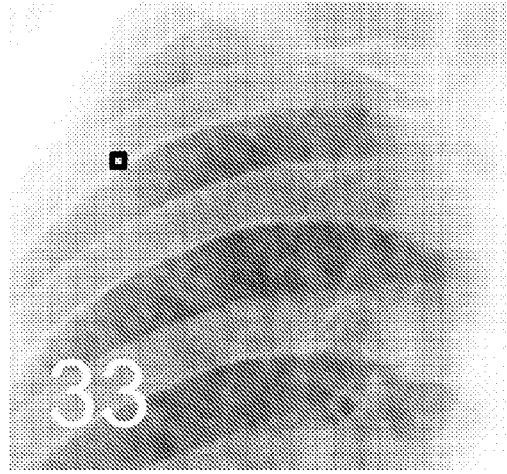

METHODS AND SYSTEMS FOR DETERMINING OPTIMAL FEATURES FOR CLASSIFYING PATTERNS OR OBJECTS IN IMAGES

CROSS-REFERENCE TO RELATED APPLICATIONS

The present application is a National Phase Application of International Application No. PCT/US2008/065043, filed May 29, 2008, which claims priority to U.S. Patent Application No. 60/940,603, filed May 29, 2007, which applications are incorporated herein fully by this reference.

This invention was made with government support under Grant Number EY017066, awarded by NIH. The United States Government has certain rights in the invention.

BACKGROUND

Approximately every two years, the resolution of medical imaging devices doubles, leading to ever larger numbers of pixels to be inspected and evaluated by clinicians, if it is assumed that increasing resolution increases quality of care and clinical outcome. Together with the fact that there are limits to what society is willing to spend on health care, and a decreasing efficiency of physicians and other care providers, this means that computer analysis of these images has to rapidly become dependable enough to increase the quality, cost-effectiveness, and efficiency of diagnostic screening, and disease progression evaluation.

The essence of computer assisted diagnosis of images is to assign a score or number to an image, in an objective, reproducible manner, so that the disease information in an image can be dealt with in the same way as a comparatively simple to interpret blood pressure reading, a weight, or serum glucose level.

The three leading causes of blindness in the Western world are age related macular degeneration (approximately 500,000 new cases of blindness annually in the US alone), diabetic retinopathy (25,000 cases of blindness annually), and glaucoma (20,000 cases of blindness annually). All affect primarily structures in the retina: the macula, the optic disc and the entire retina respectively, all require retinal imaging of some form for diagnosis and management. Because effective treatment for diabetic retinopathy, glaucoma and just now with VEGF inhibitors, macular degeneration, is available if the disease is diagnosed timely, screening for these diseases is effective, and has in fact shown to be cost-effective for patients with diabetes. Because the numbers of patients at risk are huge, in the tens of millions, and would have to be examined regularly by trained experts, computer assisted diagnosis of these images is essential.

Even more importantly, with increased availability of genetic testing for the risk of developing retinal diseases, patients will have to be examined to ascertain whether they have the diseases. Analysis of retinal images will allow much more precise targeting of genetic testing, as well as better scoring for the disease to which the patient is at risk.

The limiting step in image analysis algorithms has become that they mimic the limited visual system of expert clinicians. The current approach to computer assisted lesion detection and segmentation of image structures is limited as it is asymptotically approaching the capabilities of the human visual system of the experts that initially annotated the images. The human visual system cannot appreciate all information available in an image or scene. In addition, annotation of images for machine learning algorithms will be a bottleneck.

What are needed are methods and systems that automate the process of image analysis and are not limited by the human visual system.

SUMMARY

Provided are methods and systems for determining optimal features for classifying patterns or objects. Also provided are methods for image analysis. Further provided are methods for image searching.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 11 illustrates a cross-correlation of Age-related Macular Degeneration (AMD) features with Stargardt features;

FIGS. 14A and B show a portion of a right lung to illustrate the differences between the stages of a disease.

DETAILED DESCRIPTION

Figure 1:
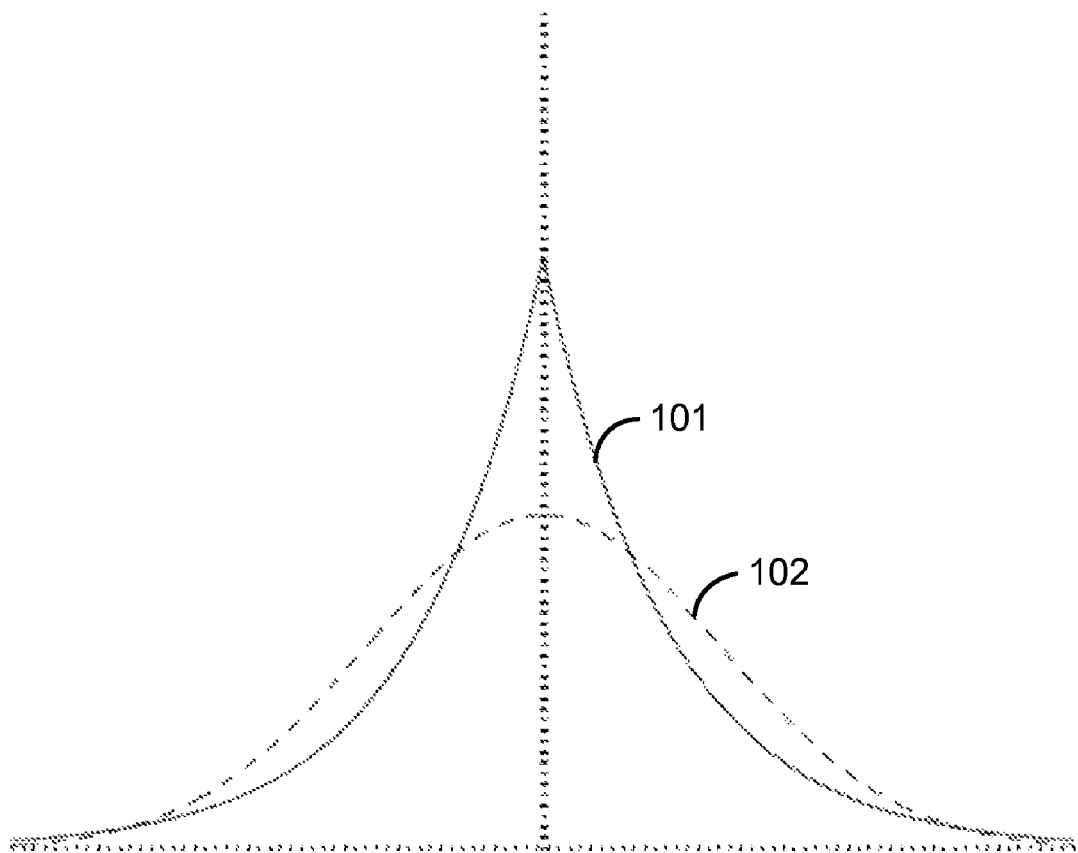
FIG. 1 is an exemplary probability density.

Before the present methods and systems are disclosed and described, it is to be understood that the methods and systems are not limited to specific methods, specific components, or to particular compositions, and as such may vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

I. INDEPENDENT COMPONENT ANALYSIS (ICA)

Independent component analysis (ICA), as know in the art, is a method for finding underlying factors or components from multivariate (multidimensional) statistical data. What distinguishes ICA from other methods is that it looks for components that are both statistically independent, and non-gaussian. The basic concepts, applications, and estimation principles of ICA are described herein.

A long-standing problem in statistics and related areas is how to find a suitable representation of multivariate data. Representation here means that the data is transformed so that its essential structure is made more visible or accessible.

In neural computation, this fundamental problem belongs to the area of unsupervised learning, since the representation must be learned from the data itself without any external input from a supervising "teacher." A good representation is also a central goal of many techniques in data mining and exploratory data analysis. In signal processing, the same problem can be found in feature extraction, and also in source separation problems.

Assume that the data consists of a number of variables that have been observed. Denote the number of variables by m and the number of observations by T. The data can then be denoted by $x_i(t)$ where the indices take the values $i=1, \ldots, m$ and $t=1, \ldots, T$. The dimensions m and T can be very large.

A very general formulation of the problem can be stated as follows: What could be a function from an m-dimensional space to an n-dimensional space such that the transformed variables give statistically independent representation of the information in the data that is otherwise hidden in the large data set? That is, the transformed variables should be the underlying factors or components that describe the essential structure of the data. It is hoped that these components correspond to some physical causes that were involved in the process that generated the data in the first place.

In most cases, only linear functions are considered, because then the interpretation of the representation is simpler, and so is its computation. Thus, every component, for example, $y_i$, is expressed as a linear combination of the observed variables:

$$y_i(t) = \sum_j w_{ij} x_j(t), \text{ for } i = 1, \ldots, n, j = 1, \ldots, m \quad (1)$$

where the $w_{ij}$ are some coefficients that define the representation. The problem can then be rephrased as the problem of determining the coefficients $w_{ij}$. Using linear algebra, the linear transformation can be expressed in Eq. (1) as a matrix multiplication. Collecting the coefficients $w_{ij}$ in a matrix W, the equation becomes $$\begin{pmatrix} y_1(t) \\ y_2(t) \\ \vdots \\ y_n(t) \end{pmatrix} = W \begin{pmatrix} x_1(t) \\ x_2(t) \\ \vdots \\ x_m(t) \end{pmatrix} \quad (2)$$

A basic statistical approach can comprise considering the $x_i(t)$ as a set of T realizations of random variables. Thus each set $x_i(t)$, $t=1, \ldots, T$ is a sample of one random variable; the random variable is denoted by $x_i$. In this framework, the matrix can be determined by the statistical properties of the transformed components $y_i$.

A principle that can be used for determining W is independence: the components $y_i$ should be statistically independent. This means that the value of any one of the components gives no information on the values of the other components. In fact, in factor analysis it is often claimed that the factors are independent, but this is only partly true, because factor analysis assumes that the data has a gaussian distribution. If the data is gaussian, it is simple to find components that are independent, because for gaussian data, uncorrelated components are always independent.

In reality, however, the data often does not follow a gaussian distribution, and the situation is not as simple as those methods assume. For example, many real-world data sets have supergaussian distributions. This means that the random variables take relatively more often values that are very close to zero or very large. In other words, the probability density of the data is peaked at zero and has heavy tails (large values far from zero), when compared to a gaussian density of the same variance. An example of such a probability density is shown in FIG. 1. In FIG. 1, the Gaussian density is given by a dashed line 101 while the Laplacian distribution is given by a solid line 102.

This is the starting point of ICA; determining statistically independent components, in the general case where the data is for example, nongaussian. ICA can be defined as follows: given a set of observations of random variables $(x_1(t), x_2(t), \ldots, x_n(t))$, where t is the time or sample index, assume that they are generated as a linear mixture of independent components:

$$\begin{pmatrix} x_1(t) \\ x_2(t) \\ \vdots \\ x_n(t) \end{pmatrix} = A \begin{pmatrix} s_1(t) \\ s_2(t) \\ \vdots \\ s_n(t) \end{pmatrix} \quad (3)$$

where A is some unknown matrix. Independent component analysis now can comprise estimating both the matrix A and $s_i(t)$, when only the $x_i(t)$ is observed. Note that it can be assumed here that the number of independent components is equal to the number of observed variables; this is a simplifying assumption that is not completely necessary.

Alternatively, ICA can be defined as follows: find a linear transformation given by a matrix W as in Eq. (2), so that the random variables $y_i$, $i=1, \ldots, n$ are as independent as possible. This formulation is not really very different from the previous one, since after estimating A, its inverse gives W.

It can be shown that the problem is well-defined, that is, the model in Eq. (3) can be estimated if and only if the components $s_i$ are nongaussian. This is a fundamental requirement that also explains the main difference between ICA and factor analysis, in which the nongaussianity of the data is not taken into account. In fact, ICA can be considered as nongaussian factor analysis, since in factor analysis, the data are modeled as linear mixtures of some underlying factors.

In short, ICA enables estimation of independent components from linear mixtures with no more assumptions required than their independence. Independence is a much stronger property than uncorrelatedness. Consider a blind source separation problem, many different uncorrelated representations of the signals could be found that would not be independent and would not separate the sources. Uncorrelatedness in itself is not enough to separate the components. This is also the reason why principal component analysis (PCA) or factor analysis cannot separate the signals: they give components that are uncorrelated, but little more.

Figure 2:
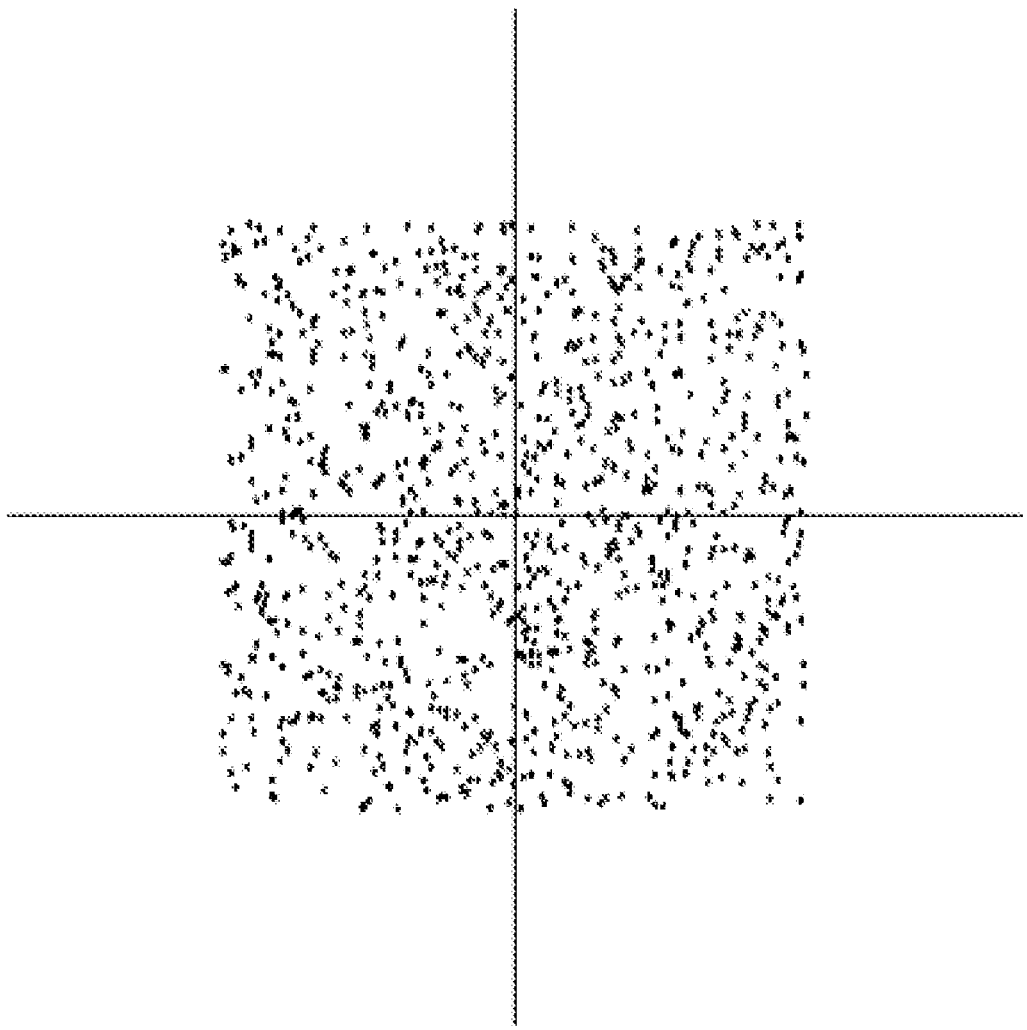
FIG. 2 illustrates data from two components that have values inside a certain interval with equal probability.

Provided is an example using two independent components with uniform distributions, that is, the components can have any values inside a certain interval with equal probability. Data from two such components are plotted in FIG. 2. The data is uniformly distributed inside a square due to the independence of the components.

Figure 3:
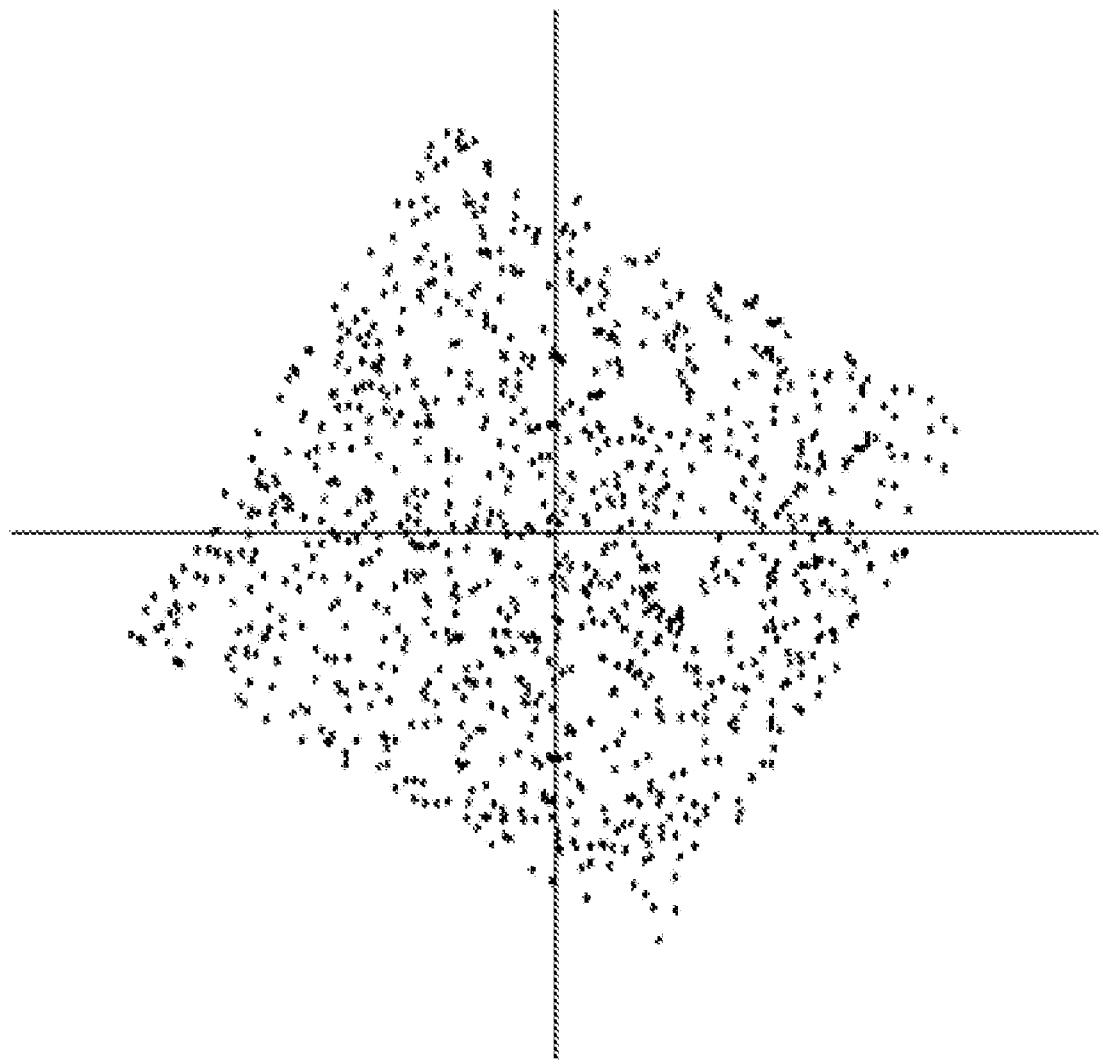
FIG. 3 shows two uncorrelated mixtures of independent components.

Now, FIG. 3 shows two uncorrelated mixtures of those independent components. Although the mixtures are uncorrelated, it can be clearly seen that the distributions are not the same. The independent components are still mixed, using an orthogonal mixing matrix, which corresponds to a rotation of the plane. It can also be seen that in FIG. 3 the components are not independent: if the component on the horizontal axis has a value that is near the corner of the square that is in the extreme right, this clearly restricts the possible values that the components on the vertical axis can have.

In fact, by using well-known decorrelation methods, any linear mixture of the independent components can be transformed into uncorrelated components, in which case the mixing is orthogonal. ICA enables the estimation of the orthogonal transformation that is left after decorrelation. This is something that classic methods cannot estimate because they are based on essentially the same covariance information as decorrelation.

FIG. 3 also gives a hint as to why ICA is possible. By locating the edges of the square, the rotation can be computed that gives the original components. In the following, more sophisticated methods are provided for estimating ICA.

Nonlinear decorrelation is a basic ICA method. One way of stating how independence is stronger than uncorrelatedness is to say that independence implies nonlinear uncorrelatedness: If $s_1$ and $s_2$ are independent, then any nonlinear transformations $g(s_1)$ and $h(s_2)$ are uncorrelated (in the sense that their covariance is zero). In contrast, for two random variables that are merely uncorrelated, such nonlinear transformations do not have zero covariance in general.

Thus, ICA can be performed by a stronger form of decorrelation, by finding a representation where the $y_i$ are uncorrelated even after some nonlinear transformations. This gives a simple principle of estimating the matrix W:

ICA estimation principle 1: Nonlinear decorrelation. Find the matrix W so that for any $i \neq j$, the components $y_i$ and $y_j$ are uncorrelated, and the transformed components $g(y_i)$ and $h(y_j)$ are uncorrelated, where g and h are some suitable nonlinear functions.

This is a valid approach to estimating ICA: If the nonlinearities are properly chosen, the method does find the independent components. In fact, computing nonlinear correlations between the two mixtures in FIG. 3, it can be seen that the mixtures are not independent.

Although this principle is very intuitive, it leaves open an important question: How should the nonlinearities g and h be chosen? Answers to this question can be found be using principles from estimation theory and information theory, as are known to one of ordinary skill in the art. Estimation theory provides the most classic method of estimating any statistical model: the maximum likelihood method. Information theory provides exact measures of independence, such as mutual information. Using either one of these theories, the nonlinear functions and can be determined in a satisfactory way.

Independent components can be the maximally nongaussian components. Another intuitive principle of ICA estimation is maximum nongaussianity. According to the central limit theorem, sums of nongaussian random variables are closer to gaussian that the original ones. Therefore, if a linear combination $$y = \sum_i b_i x_i$$

of the observed mixture variables is taken (which, because of the linear mixing model, is a linear combination of the independent components as well), this will be maximally nongaussian if it equals one of the independent components. This is because if it were a real mixture of two or more components, it would be closer to a gaussian distribution, due to the central limit theorem.

Thus, the principle can be stated as follows:

ICA estimation principle 2: Maximum nongaussianity. Find the local maxima of nongaussianity of a linear combination $$y = \sum_i b_i x_i$$

under the constraint that the variance of y is constant. Each local maximum gives one independent component.

To measure nongaussianity in practice, approximations of negentropy or the kurtosis can be used, for example. Mutual information is another example of a method for measuring statistical independence of signals. Kurtosis is a higher-order cumulant, which are generalizations of variance using higher-order polynomials. Comparing the nongaussianities of the components given by the axes in FIG. 2 and FIG. 3, it can be seen that in FIG. 3 they are smaller, and thus FIG. 3 cannot give the independent components.

An interesting point is that this principle of maximum nongaussianity shows the very close connection between ICA and an independently developed technique called projection pursuit. In projection pursuit, the goal is maximally nongaussian linear combinations, which are used for visualization and other purposes. Thus, the independent components can be interpreted as projection pursuit directions.

When ICA is used to extract features, this principle of maximum nongaussianity also shows an important connection to sparse coding that has been used in neuroscientific theories of feature extraction. The idea in sparse coding is to represent data with components so that only a small number of them are "active" at the same time. This is equivalent, in some situations, to finding components that are maximally nongaussian.

The projection pursuit and sparse coding connections are related to a deep result that says that ICA gives a linear representation that is as structured as possible. This statement can be given a rigorous meaning by information-theoretic concepts, and shows that the independent components are in many ways easier to process than the original random variables. In particular, independent components are easier to code (compress) than the original variables.

There are many other methods for estimating the ICA model as well. What they all have in common is that they consider some statistics that are not contained in the covariance matrix (the matrix that contains the covariances between all pairs of the $x_i$).

Using the covariance matrix, the components can be decorrelated in the ordinary linear sense, but not any stronger. Thus, ICA methods can use some form of higher-order statistics, which specifically means information not contained in the covariance matrix. Two types of higher-order information have been described: the nonlinear correlations and kurtosis. As known to one of ordinary skill in the art, many other types can be used as well.

In addition to the estimation principle, a method for implementing the computations can be needed. Because the estimation principles use nonquadratic functions, the computations needed usually cannot be expressed using simple linear algebra, and therefore they can be quite demanding. Numerical algorithms can be used as part of ICA estimation methods.

The numerical methods can be based on optimization of some objective functions. For example, a basic optimization method is the gradient method. For example, the gradient method can be used to find the maxima of the nongaussianity as measured by the absolute value of kurtosis.

Methods for ICA can also use preprocessing techniques such as centering, whitening and dimensionality reduction in order to simplify and reduce complexity. Whitening and dimension reduction can be achieved with principal component analysis or singular value decomposition. Whitening ensures that all dimensions are treated equally a priori before the algorithm is run. Exemplary algorithms for ICA include infomax, FastICA and JADE.

II. EXEMPLARY METHODS

Applications of the present methods and systems include, but are not limited to, screening or classifying images in medicine; computer-aided diagnosis; automated, feature-based image retrieval; pheno-type, geno-type correlations (gene-sorting); and the like.

"Feature detectors" can be made to emerge from samples of (indoor and outdoor) scene images by a mathematical technique called redundancy reduction. If natural scene images are sampled, most of the feature detectors, which are as statistically independent as possible from each other, resemble the receptive field properties of mammalian primary cortical cells to a surprising degree. The methods and systems provided can sample images that do not represent natural scenes, for example retinal images, and generate feature detectors which do not resemble known human receptive fields and in fact do not have a known biological counterpart. Moreover, these feature detectors can differentiate between images, especially subtle differences between textures based on their higher order statistics, which are not easy to differentiate by the human visual system.

As disclosed herein, independent component analysis (ICA) can be used for deriving "feature detectors" (which can be grouped into a "feature set") from samples of natural (indoor and outdoor) scenes. When the samples from the natural scene images are processed by ICA, a set of statistically independent components (ICs) or "feature detectors" are produced, which depending on chosen constraints, resemble specific receptive field properties of human visual cortex. Provided are methods and systems that can utilize ICA with samples taken from images that do not represent natural scenes, for example retinal or X-ray images. In so doing, feature detectors can be found which do not resemble known receptive field properties, and in some cases are not differentiable by the human visual system. These feature detectors can be used for differentiating or classifying images that are difficult to evaluate by human experts. These feature detectors can also be used for differentiating or classifying images that are impossible to evaluate by human experts.

An application of the methods and systems is to use the ICA generated feature detectors to train a machine learning system to classify images into normal or disease states, and then using the trained system and its feature detectors to classify previously unknown images. These methods and systems can be used to detect subtle, pre-clinical features in medical images. These methods and systems can be used to screen for pathological features in medical images for presentation to a healthcare specialist. Another application is to use the ICA generated feature detectors to differentiate image based phenotypes with known genetic predisposition to a disease.

If used to derive a feature from certain types of images, multiple statistically independent components may result that are non-Gaussian but "close" to each other in a mutual information sense because they are shifted variants. Because shifted variant components are equivalent in a feature detection context, Independent Invariant Component Analysis, a method that assures that components are both statistically independent as much as possible, as well as invariant in some sense, for example shift invariant, can be used. For example, under shift (or rotation) the features provide the same response to an impulse function. Feature detectors can be components obtained through independent invariant component analysis by ensuring components are not shifted variants in a medical imaging sense.

The disclosed methods can obtain a minimal set of features (detectors) to differentiate a plurality of images into multiple classes wherein the feature detectors are obtained as disclosed herein and the classes are defined externally to the images, by using for example, statistical, regression, k-nearest neighbor (knn), or similar classifiers and training on known classes and using feature selection.

The disclosed methods and systems can utilize image preprocessing to eliminate noise or common features (such as removing salient vessels), and/or transforming to another color space such as HSI (Hue, Saturation and Intensity) to extract relevant features that are not dependent on hue or saturation, for example, but are primarily due to spatial intensity variations, or conversely that are characterized more by the hue or saturation than by the spatial intensity variations.

Figure 4:
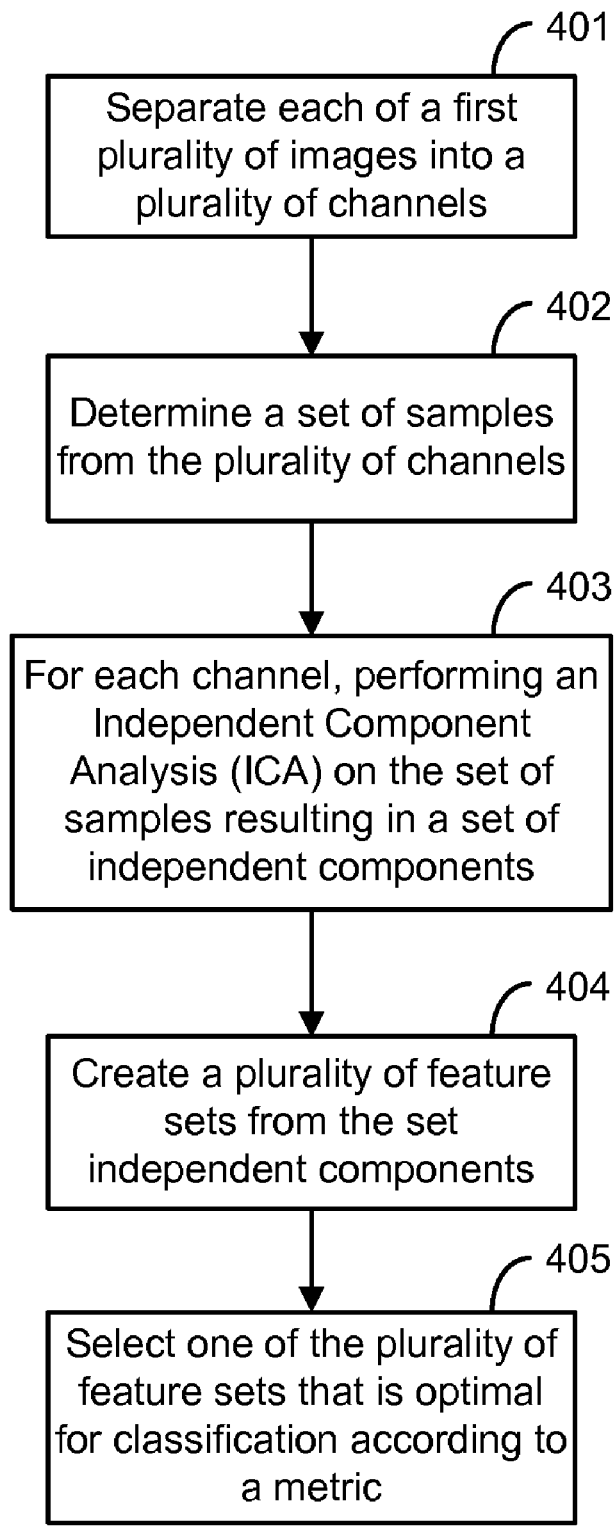
FIG. 4 is a flow diagram illustrating a method for determining optimal features for classifying patterns or objects in images.

In one aspect, illustrated in FIG. 4, provided are methods for determining optimal features for classifying a pattern in an image comprising separating each of a first plurality of images into a plurality of channels at 401, determining a set of samples from the plurality of channels at 402, for each channel, performing Independent Component Analysis (ICA) on the set of samples resulting in a set of independent components at 403, creating a plurality of feature sets from the set independent components at 404, and selecting one of the plurality of feature sets that is optimal for classification according to a metric at 405.

The ICA can use two dimensional samples from two-dimensional channels, three dimensional samples from three-dimensional channels, and the like. The metric can be an area under a Receiver Operating Characteristic (ROC) curve of classification, using one of the plurality of feature sets to classify a different plurality of channels, also referred to as a test set the test set. The metric can be the accuracy of the classification, using the optimal feature set to classify a different plurality of channels, also referred to as a test set.

The set of samples can comprise a plurality of regions from the first plurality of images. Each sample of the set of samples, X, can be represented by a vector $x_i$ and can be the product of a linear combination of N basis functions, wherein the N basis functions are the underlying features that a visual system would use to compose the image.

The methods can further comprise representing the resulting optimal feature set by an intensity image array. The methods can further comprise outputting a visual representation of the optimal feature set. The optimal feature set can be spatially invariant. The optimal feature set can represent optimal independent components for classifying a pattern.

The methods can further comprise receiving a second plurality of images and segmenting the second plurality of images into a plurality of regions according to a property by convolution with the optimal feature set. For example, a property can be one or more of, the probability of the image indicating disease, or the image displaying abnormalities, having a certain quality compared to the imaged objects, and the like.

Performing ICA can comprise constructing a matrix A wherein the N basis functions are the columns of the matrix A. Performing ICA can further comprise letting $X=[x_1(t) \, x_2(t) \ldots x_n(t)]$ be the set of samples, assuming the set of samples came from a mixture $S=[s_1(t) \, s_2(t) \ldots s_n(t)]$ and the matrix A, as in $X=AS$, and estimating both A and S using X.

The plurality of channels can comprise, for example, red, green, and blue; a vectorial representation of multichannel data; color opponency channels as in a mammalian visual cortex; hue, saturation, brightness channels; and the like.

Selecting a feature set that is optimal for classification can comprise a classifier. For example, in feature classification, a classifier is trained on a set of data, referred to as the training set, and then repeatedly tested on another set of data, referred to as the test set. By repeatedly testing with a subset of all features, which changes, and comparing the performance of the classifier with different feature subsets on the same test set, an optimal subset of features can be found. Any classifier known in the art can be used, and for example sequential forward feature selection, or any other optimization method, can be used to obtain an optimal set of features, by adding all features to an initially empty feature set one by one and retaining only the new feature that showed the highest gain in classification performance.

Figure 5:
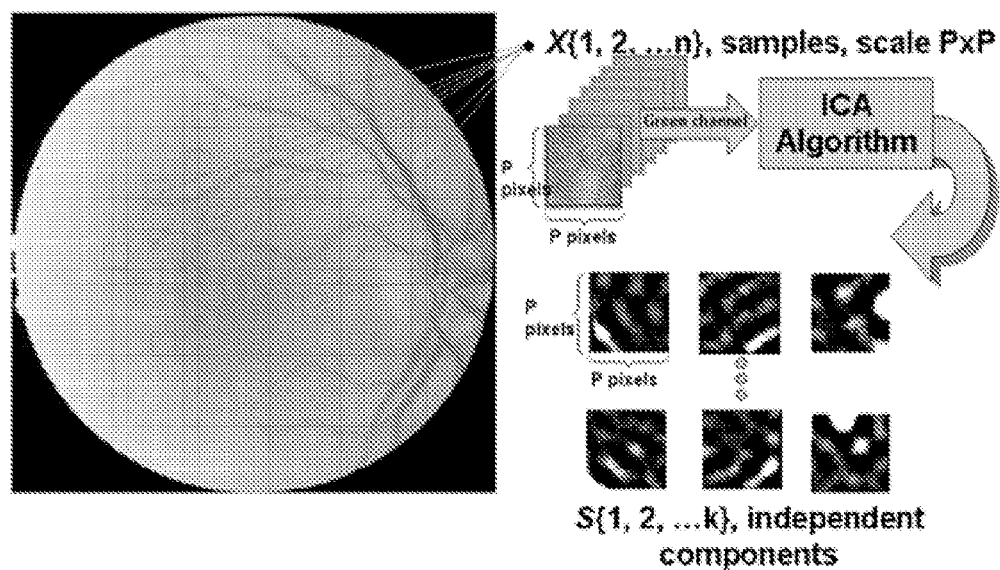
FIG. 5 illustrates a method for determining optimal features for classifying patterns or objects in images.

FIG. 5 illustrates the methods graphically. The set of samples can be $X\{1, 2, 3 \ldots n\}$ and have a scale of P pixels. For example, the components can be derived from a sample size of P×P pixels. Convenient scale sizes can be quadratic, i.e. 2, 4, 8, 16, 32, 64, 128, . . . pixels, up to the size of the image.

B. M. ter Haar Romeny, "Front-End Vision and Multi-Scale Image Analysis", Kluwer Academic Publisher, 2003 is herein incorporated by reference in its entirety for teachings related to image analysis. The plurality of channels can comprise red, green, blue, for color images or any other vectorial representation of multichannel data, such as for spectroscopic images. The resulting set of independent components can then be represented by P×P grayscale intensity image arrays, $S\{1, 2, 3, \ldots, k\}$. For visualization, the intensities can be mapped to dark or to bright to represent relative magnitudes within the array.

Figure 6:
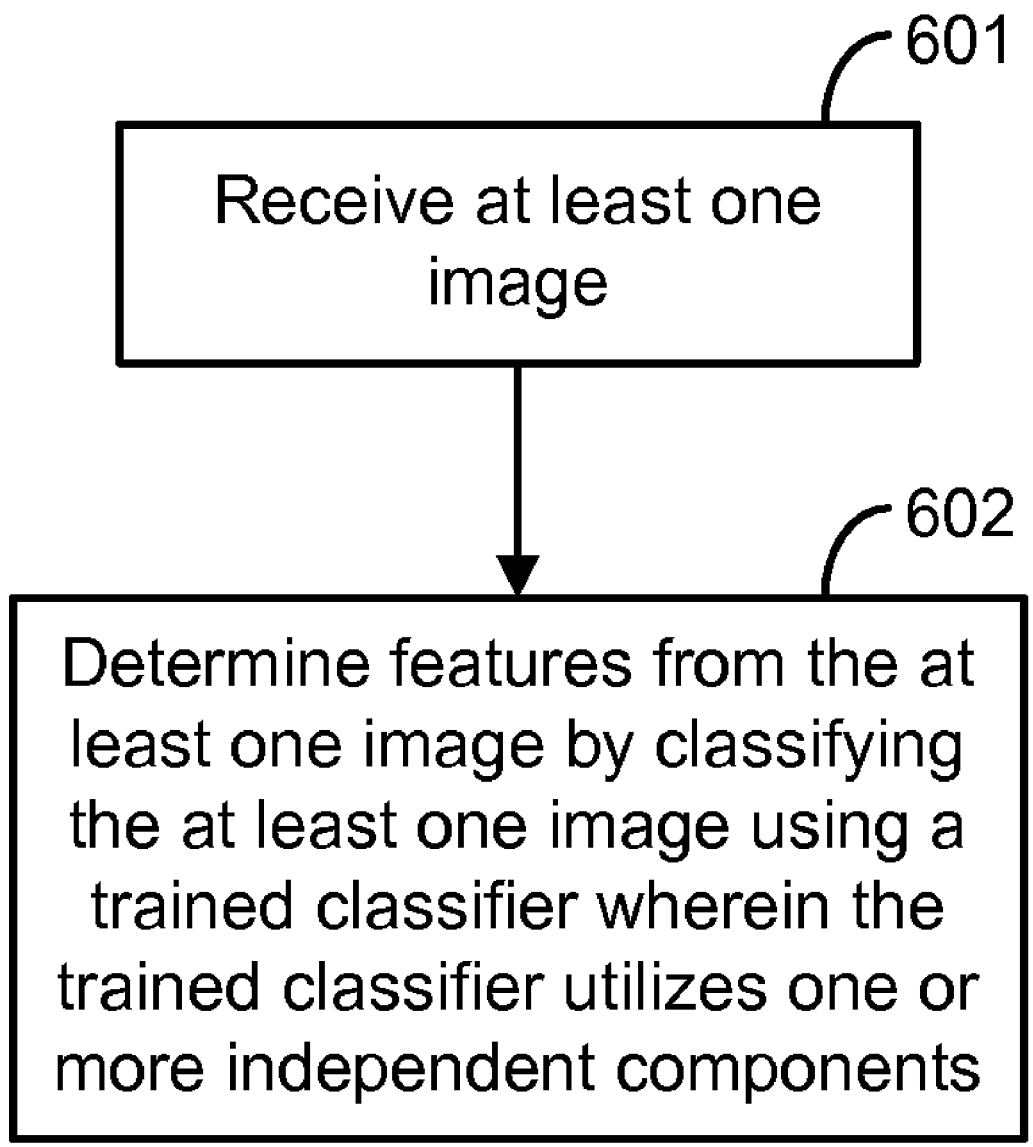
FIG. 6 is a flow diagram illustrating a method for image analysis.

In another aspect, illustrated in FIG. 6, provided are methods for image analysis comprising receiving at least one image at 601 and determining features from the at least one image by classifying the at least one image using a trained classifier wherein the trained classifier utilizes one or more independent components at 602.

The at least one image can be of a non-natural scene. The at least one image can be for example one of, a color retinal image, a monochrome retinal image, a color stereo pair, a monochrome stereo pair, an x-ray image, a computer-aided tomographic (CAT) scan image, an angiogram image, a fMRI image, a PET image, and the like.

The methods can further comprise training the classifier, wherein training the classifier comprises presenting, to the classifier, a pre-classified image, separating the pre-classified image into a plurality of channels, determining a set of samples from the plurality of channels, and for each channel, performing an Independent Component Analysis (ICA) on the set of samples resulting in a set of independent components. The trained classifier can be one of, a k-Nearest Neighbors classifier, a linear discriminant classifier, a quadratic discriminant classifier, a support vector machine, and the like.

For example, a probabilistic Bayes classifier that applies Bayes' theorem can be used for independent component-based classification. The independence assumptions required for the Bayes classifier can be consistent with the ICA methodology. The Bayes classifier requires a small amount of training data to estimate parameters (for example, means and variances of the variables) necessary for classification. Because independent variables are assumed, only the variances of the variables for each class need to be determined and not the entire covariance matrix.

Another statistical method that can be used for classification is partial least squares regression (PLS-regression), which bears some relation to principal component analysis. PLS finds a linear model describing predicted variables in terms of other observable variables. PLS discovers fundamental relations between a matrix of latent variables (X) and the covariance structures (Y). The PLS model can be used to find the multidimensional direction in the X space that explains the maximum multidimensional variance direction in the Y space, i.e. the weight of feature in classifying an image.

Figure 7:
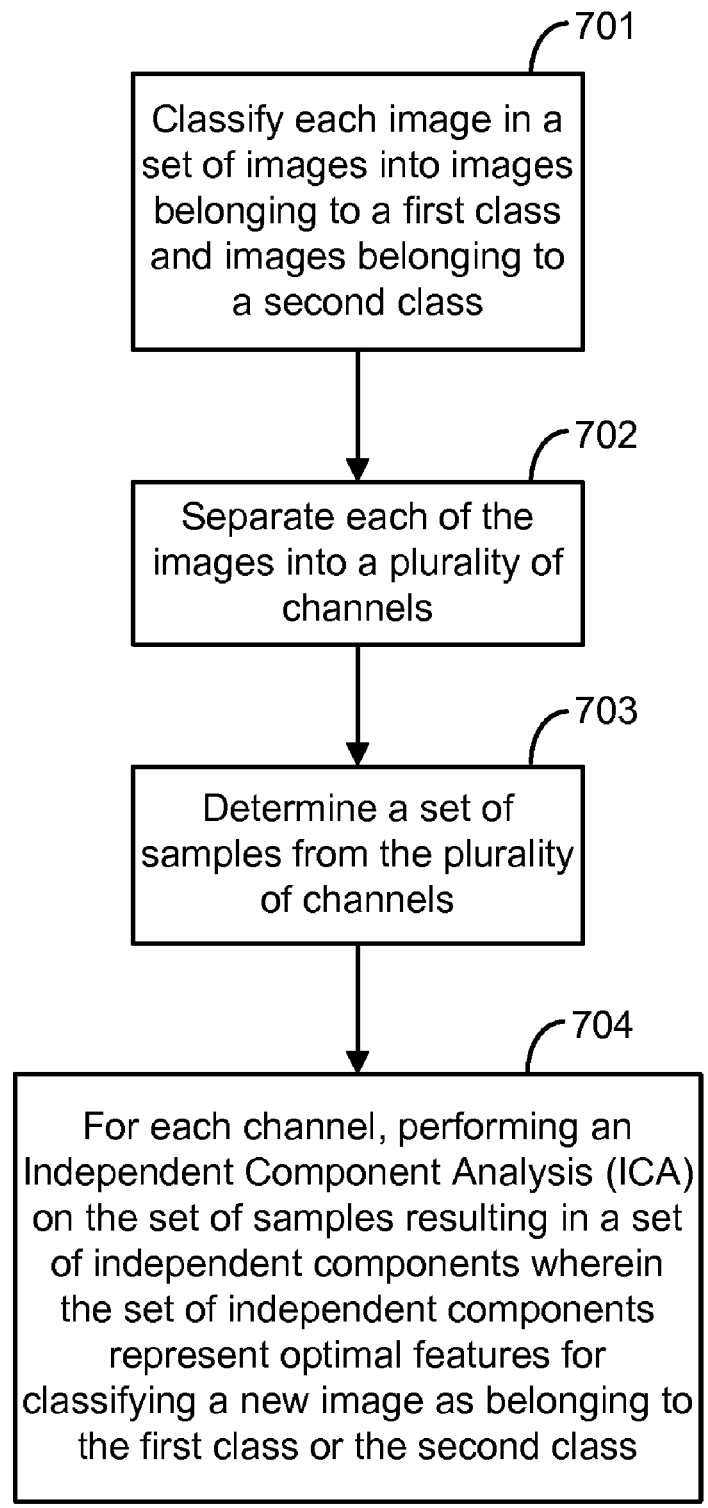
FIG. 7 is a flow diagram illustrating a method for image analysis.

In yet another aspect, illustrated in FIG. 7, provided are methods for image analysis comprising classifying each image in a set of images into images belonging to a first class and images belonging to a second class at 701, separating each of the images into a plurality of channels at 702, determining a set of samples from the plurality of channels at 703, and for each channel, performing an Independent Component Analysis (ICA) on the set of samples resulting in a set of independent components wherein the set of independent components represent optimal features for classifying a new image as belonging to the first class or the second class at 704.

Classifying each image in a set of images into images belonging to a first class and images belonging to a second class can comprise classifying pixels of each image into pixels belonging to the first class and pixels belonging to the second class. For example, the first class can be one of vessels, bone, or tumor tissue and the second class can be one of nerve tissue, soft tissue, or healthy tissue. The methods can further comprise determining the probability that the new image belongs to the first or second class.

The pixels of an image can usually be divided into several distinct classes of similar pixels. For example, pixels in a medical image could be divided into pixels belonging to vessels or nerve tissue, or bone and soft tissue, or to tumor and healthy tissue. Using a set of example images in which an expert has assigned class labels, referred to as a training set, image features can be derived that are able to distinguish between the pixels of different classes. Possible features can be, for example, pixel intensity, the average intensity in a neighborhood surrounding the pixel, edge strength, and the like. However, in the methods and systems provided, image features can be derived by performing ICA on the training set. Features generated with ICA may not resemble known receptive field properties such as pixel intensity, the average intensity in a neighborhood surrounding the pixel, edge strength, and the like. For a pixel in a new image its features can be compared with the distribution of features in the training set and the probability that the pixel belongs to a certain class can be determined. This process is called pixel classification.

An application of image classification using features is content-based image retrieval (CBIR). In this application, salient features which depict textures are detected and used to index images in large databases, then to search the database for images with similar low-level color, shape, and texture. One pixel-based feature detection approach applies a bank of Gabor filters in a polar spectral tessellation as known to one of ordinary skill in the art. An image is divided into tiles and each tile is characterized by the first and second central moments of the Gabor texture features. Wavelets have been used in a similar manner. Unlike ICA, these approaches do not create a feature set that is guaranteed to be statistically independent. The methods and systems provided can utilize CBIR.

Figure 8:
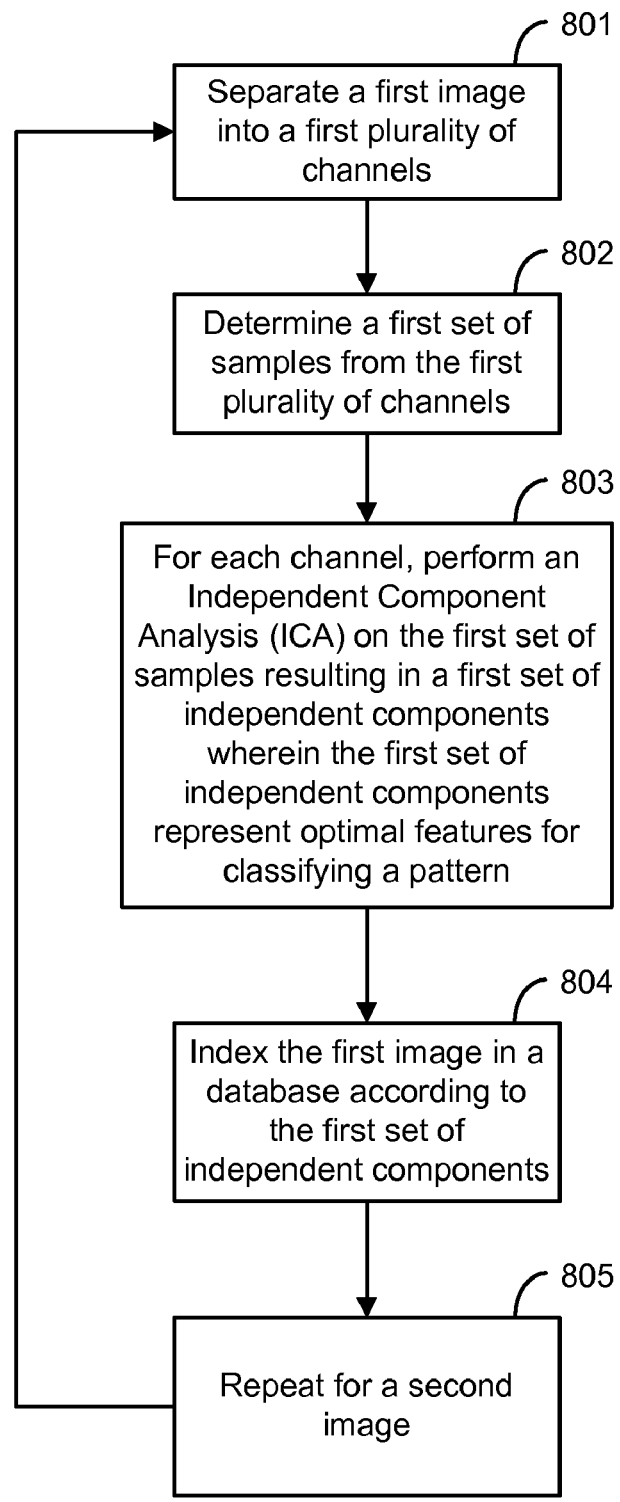
FIG. 8 is a flow diagram illustrating a method for content-based image retrieval (CBIR)

In another aspect, illustrated in FIG. 8, provided are methods for content-based image retrieval (CBIR) comprising separating a first image into a first plurality of channels at 801, determining a first set of samples from the first plurality of channels at 802, for each channel, performing an Independent Component Analysis (ICA) on the first set of samples resulting in a first set of independent components wherein the first set of independent components represent optimal features for classifying a pattern at 803, indexing the first image in a database according to the first set of independent components at 804, and repeating 801-804 for a second image at 805.

The methods can further comprise generating a third set of independent components for a third image and searching the database for images having a set of independent components similar to the third set of independent components.

In one embodiment, ICA can be used to collect a number of small regions from an image as "samples" of the complex features within an image or a set of images. Adopting the most commonly used notation, each image sample, represented by a vector $x_i$, can be assumed to be the product of a linear combination of N basis functions which are the underlying features that a visual system would use to compose the image. Following methods used in Independent Component Analysis, the basis functions can become the columns of a matrix A. The details of how the independent components derived from a set of samples, X, can be found in a number of sources:

Let $X=[x_1(t)\ x_2(t)\ \ldots\ x_n(t)]$ be a set of observed variables, i.e. the "samples" randomly collected from the images, and assume that they come from the linear mixture of the sources, $S=[s_1(t)\ s_2(t)\ \ldots\ s_n(t)]$, and the linear mixing matrix, A, as in $$X=AS \quad (4)$$

Then ICA can comprise estimating both A and S using only the observations X and the assumption that the source signals are statistically independent. The statistical independence of the sources means that their joint probability can be factorized as $$p(S) = \prod_{i=1}^{N} p(s_i) \quad (5)$$

where $p(s_i)$ is the individual probability density function (pdf) of each of the sources and N is the number of sources.

Thus, ICA can determine the optimal features, in a statistical sense, from a typical set of example images. The methods and systems disclosed can utilize ICA to determine optimal features from a set of images that are not natural scenes (to the human visual cortex), for example retinal images. Sampling appropriately selected retinal images and performing ICA, can result in basis function, independent components, kernels or features—these terms can be used interchangeably—that optimally represent these images. These features, in the case of non-natural images, may not resemble known receptive field properties such as edges or color contrasts. However, they can still be used as features for image classification, including pixel feature classification.

In one aspect, ICA can be used to determine an optimal set of features from a training set, instead of selecting a set of features based on experience and performing feature selection. This approach has several advantages as the set of features is optimal, in a mathematical sense, for the set of images that is available—and can differ depending on the diagnostic task. The performance of the methods and systems do not depend on features that are based on the human visual system and can therefore surpass the performance of the human visual system.

This technique has a number of applications including content-based image retrieval. By creating ICA-based models from exemplars (images that exemplify the characteristics of the target images), a large database of images can be searched for corresponding target images. If the database of images is known to come from a subset of all images, for example, natural images, CT images, astronomical images, faces, the search speed can be correspondingly increased, as examples of such a subset can be used to obtain features that are optimal for that subset. The statistical independence ensures that the feature set is optimal and significantly reduces search time.

The ICA-based methodology for creating models of similar images can be used to screen images for disease. In one application color retinal images can be presented to the ICA where one subset had diabetic retinopathy and another contained only normal controls (no disease). Based on ICA features the two classes of images can be successfully classified. The computer-aided diagnosis technique is equally applicable to other retinal diseases, such as glaucoma, age-related macular degeneration, and other retinal diseases. This application can be extended to all medical imaging modalities for computer-aided diagnosis.

As an example, the ICA-based methodology was applied to a set of posterior-anterior chest radiographs, discussed in Example 5. The chest x-rays database was comprised of images from subjects with various stages of pneumoconiosis as determined using the International Labor Organization (ILO) classification system. Using features derived from a set of exemplars for each of four stages of pneumoconiosis, including a set of controls, features were derived to categorize the images in the database into four stages of the disease.

ICA-based methodology can be applied to set an objective pass/fail criterion for determining image quality. For example, image quality can be critical in applications where images are produced, such as medical images. ICA features can be used to implicitly model image quality for screening or automatically rejecting sub-standard images based on quality as determined by the human visual perception system. Automatic image quality evaluation can be applied to all imaging modalities and imaging systems including digital photography.

III. EXEMPLARY SYSTEM

Figure 9:
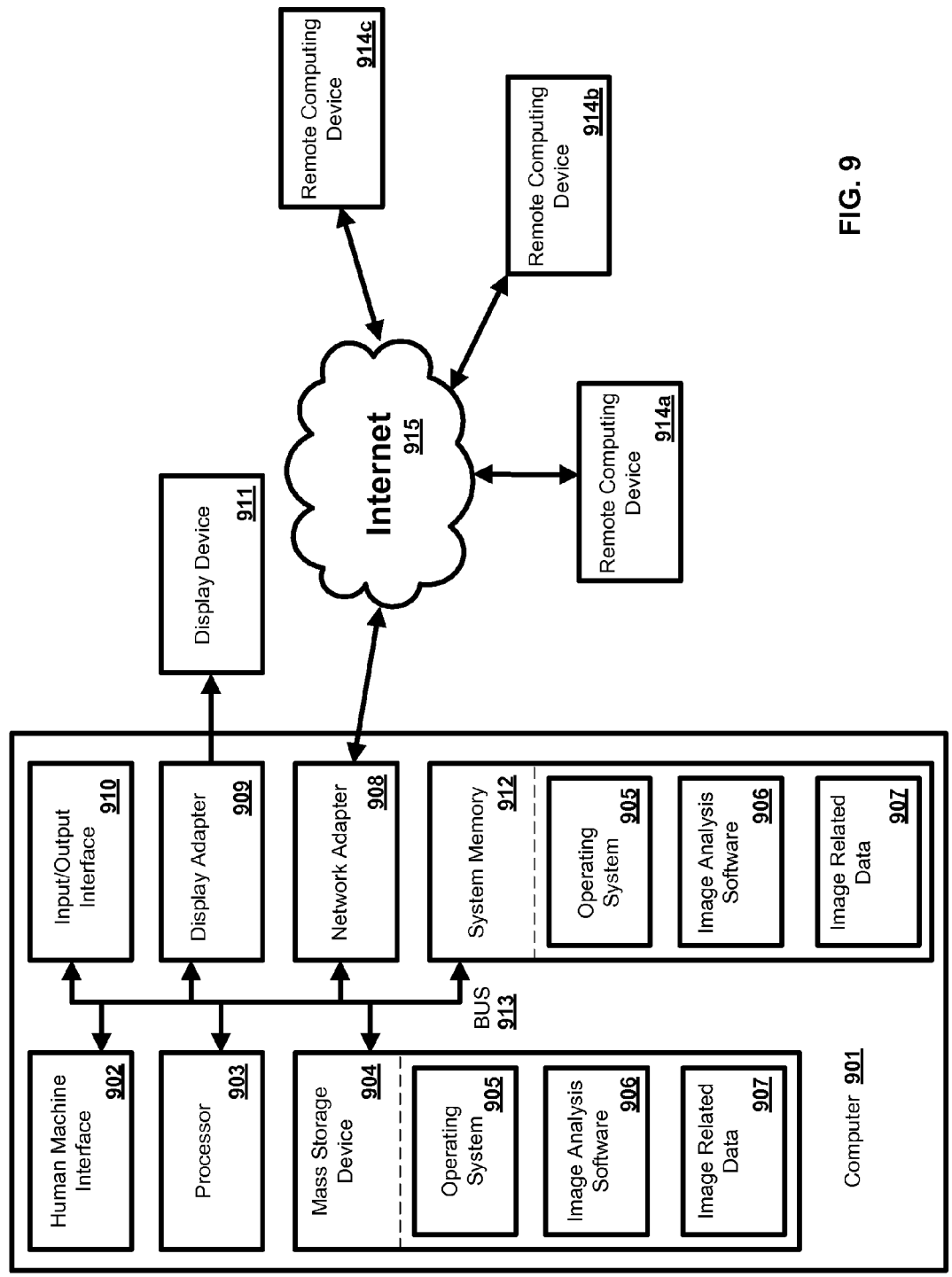
FIG. 9 is a block diagram illustrating an exemplary operating environment for performing the disclosed methods.

FIG. 9 is a block diagram illustrating an exemplary operating environment for performing the disclosed methods. This exemplary operating environment is only an example of an operating environment and is not intended to suggest any limitation as to the scope of use or functionality of operating environment architecture. One skilled in the art will appreciate that this is a functional description and that the respective functions can be performed by software, hardware, or a combination of software and hardware. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like. The method can be implemented in highly parallel devices such as floating point gate arrays (FPGA) and digital signal processors (DSP).

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 901. The components of the computer 901 can comprise, but are not limited to, one or more processors or processing units 903, a system memory 912, and a system bus 913 that couples various system components including the processor 903 to the system memory 912. In the case of multiple processing units 903, the system can utilize parallel computing. The one or more processors can perform any and/or all steps of the methods disclosed.

The system bus 913 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA) bus, Universal Serial Bus (USB) and the like. The bus 913, and all buses specified in this description can also be implemented over a wired or wireless network connection and each of the subsystems, including the processor 903, a mass storage device 904, an operating system 905, image analysis software 906, image related data 907, a network adapter 908, system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as image related data 907 and/or program modules such as operating system 905 and image analysis software 906 that are immediately accessible to and/or are presently operated on by the processing unit 903.

In another aspect, the computer 901 can also comprise other removable/non-removable, volatile/non-volatile computer storage media. By way of example, FIG. 9 illustrates a mass storage device 904 which can provide non-volatile storage of computer code, computer readable instructions, data structures, program modules, and other data for the computer 901. For example and not meant to be limiting, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and image analysis software 906. Each of the operating system 905 and image analysis software 906 (or some combination thereof) can comprise elements of the programming and the image analysis software 906. Image related data 907 can also be stored on the mass storage device 904. Image related data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. Examples of image related 907 can include, but is not limited to, image data, feature data, independent components, pre-processed images (filtered, enhanced, etc.), classifier models (coefficients or weights for neural networks or PLS models) and the like.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 903 via a human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, a display device 911 can also be connected to the system bus 913 via an interface, such as a display adapter 909. It is contemplated that the computer 901 can have more than one display adapter 909 and the computer 901 can have more than one display device 911. For example, a display device can be a monitor, an LCD (Liquid Crystal Display), or a projector. In addition to the display device 911, other output peripheral devices can comprise components such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like.

The computer 901 can operate in a networked environment using logical connections to one or more remote computing devices 914a,b,c. By way of example, a remote computing device can be a personal computer, portable computer, a server, a router, a network computer, a peer device or other common network node, and so on. Logical connections between the computer 901 and a remote computing device 914a,b,c can be made via a local area network (LAN) and a general wide area network (WAN). Such network connections can be through a network adapter 908. A network adapter 908 can be implemented in both wired and wireless environments. Such networking environments are conventional and commonplace in offices, enterprise-wide computer networks, intranets, and the Internet 915.

For purposes of illustration, application programs and other executable program components such as the operating system 905 are illustrated herein as discrete blocks, although it is recognized that such programs and components reside at various times in different storage components of the computing device 901, and are executed by the data processor(s) of the computer. An implementation of image analysis software 906 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. The computer readable media can have computer executable instructions embodied thereon for performing any and/or all steps of the methods disclosed.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

IV. EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for.

A. Example 1 i. Demonstration of ICA to Sort Photographs into Phenotypic Classes

A study was performed evaluating 200 retrospectively obtained, film-based, fundus images taken with a 30-degree Zeiss FF4 camera recorded on Ektachrome 100. One hundred (100) patients had an unequivocal diagnosis of Stargardt disease—over 80% with demonstrated ABCA-4 mutation—and one hundred (100) had non-exudative Age-related Macular Degeneration (AMD) of Age-Related Eye Disease Study (AREDS) grade 3 or 4. All images were scanned from 35 mm color slides at a resolution of ~4.5 micrometers per pixel. Field definition of images were generally of the 30 degrees field of view centered on the macula (Early Treatment Diabetic Retinopathy Study (ETDRS), field definition 2). Scanned digital images were stored as RGB color files over the central 2500 pixel diameter area. For this analysis, only the green channel (similar to red free image) was utilized, and the central image area that is retina has a diameter of 2500 pixels.

Figure 10:
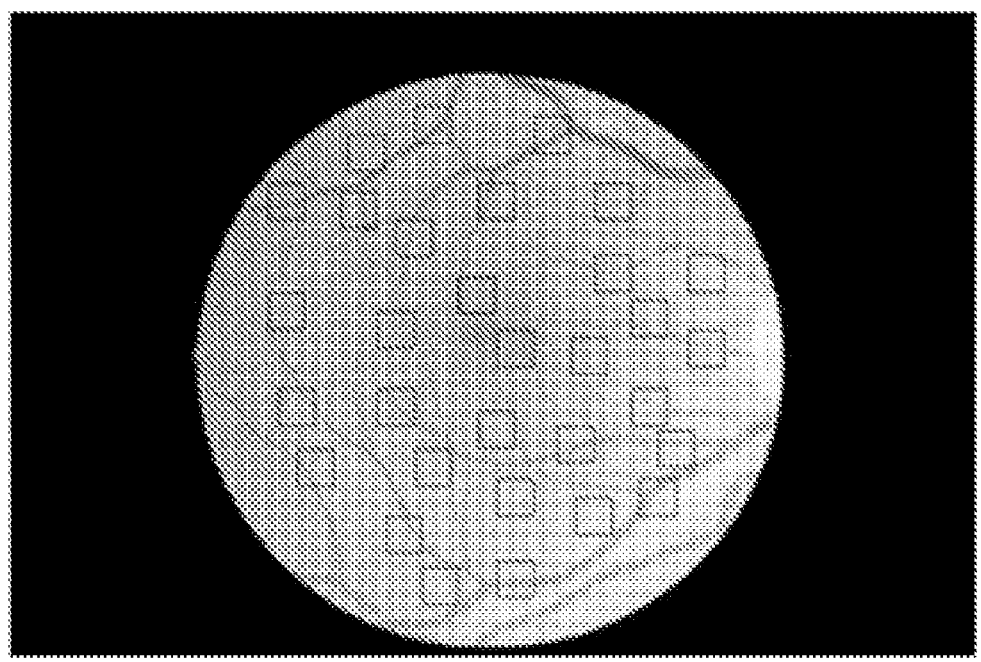
FIG. 10 shows the relative size and typical distribution of the samples over a fundus image.

Two images of each disorder, AMD and Stargardt's disease were selected as "test" images. The terms independent components and feature (detector)s are used interchangeably. Independent component analysis was used to generate the features from small samples of these images. Image resolution was reduced, resulting in a retinal mask diameter of 625 pixels in diameter (pixel footprint ~5 micrometers in dimension) to reduce the computational complexity. Each image was sampled 600 times by randomized block selection of 32×32 pixel regions, evenly distributed over the entire fundus region of the image. A total of 3,000 samples were collected from the five images. The size or scale (32×32) chosen for these samples was selected so as to include features on the scale of drusen, vessels, and pigmentation. FIG. 10 shows the relative size and typical distribution of the samples over the fundus image. Thirty-two features were determined to be adequate to characterize or classify each type of image (AMD versus Stargardt) and were calculated for each of the ten disease sample images and two test images. By cross-correlating all 32 features obtained from the Stargardt and AMD images, the features that were common to both disorders were identified. It was expected that the fundus images of the two diseases would share many features since all fundus images contained vessels, an optic disc and other common anatomical structures.

FIG. 10 is an illustration of the distribution of the initial 32×32 pixel samples of 600 selected from this fundus image. The 600 samples were block randomly distributed and oversampling was performed to assure that all portions of the fundus contribute to the independent components computed. Note that samples were only taken of the fundus, not from the surrounding mask.

Twenty (20) of the 32 features correlated highly between the two independent component disease sets (FIG. 11), and were responsive to retinal vessels and other common anatomical structures. It is the 12 features that have cross-correlations in the range of 0.38 to 0.73 that have the potential to discriminate between fundus images of the two disorders. Since only these 12 features are suitably different between the two diseases, these features are likely to be associated uniquely to the fundus images from either Stargardt or AMD. FIG. 11 illustrates a cross-correlation of AMD features with Stargardt features. Note that each of the 32 features (32×32 pixel blocks) may contribute differing weights to the disorder characterization. For instance the weight of the second AMD factor is the $4^{th}$ largest contributor to the Stargardt feature set. As shown in FIG. 11, cells in the x-corr row in section 1101 at positions AMD 1, 2, 3, 4, 5, 6, 7, 9, 11, 12, 14 and in the x-corr row in section 1102 at positions AMD 17, 18, 20, 22, 23 25, 26, 27, 32 represent high correlation (>0.85), likely representing common anatomical fundus features. Cells in the x-corr row in section 1101 at positions AMD 8, 10, 15, 16 and in the x-corr row in section 1102 at positions AMD 19, 21, 30, 31 represent correlations of 0.85-0.6; cells in the x-corr row in section 1101 at positions AMD 13 and in the x-corr row in section 1102 at positions AMD 24, 28, 29 represent correlations of 0.6-0.4; and other cells along the diagonal represent low correlation, representing features of high disease separation potential.

ii. Correlation of Some Independent Components with Disease Classes

Figure 12:
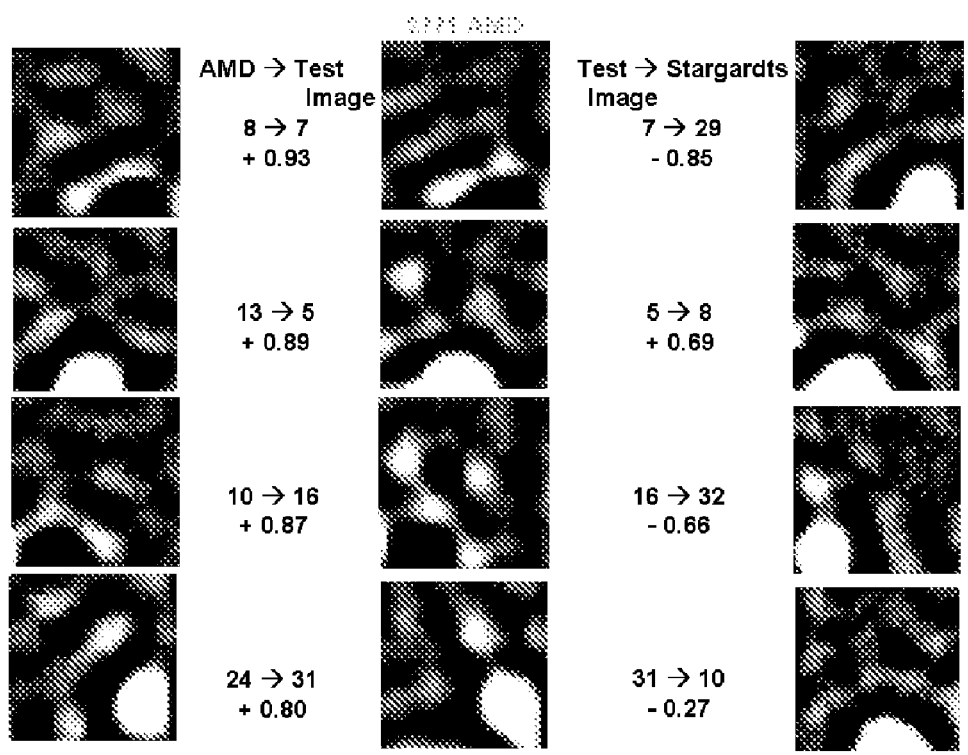
FIG. 12 indicates the top four features of a test image, in descending magnitude of correlation.
Figure 13A:
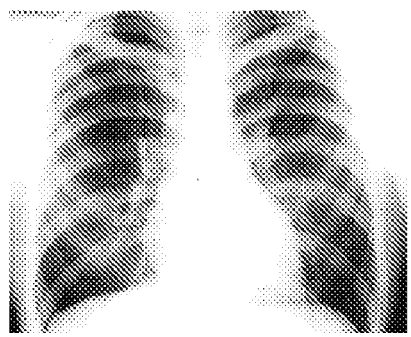
FIGS. 13A, B, C, and D illustrate four digitized x-rays.
Figure 13B:
Figure 13C:
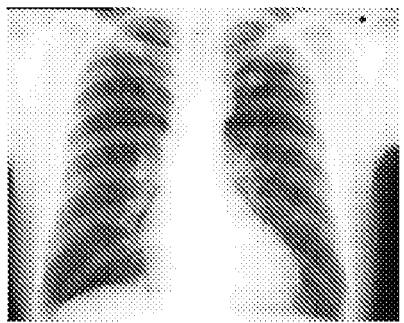
Figure 13D:
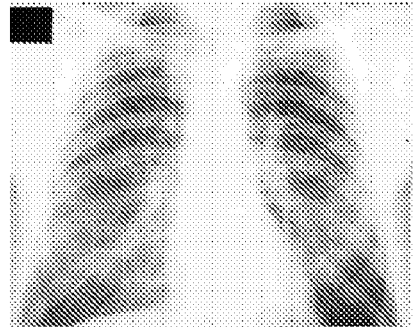

The features for the test images were compared to each of the two disease specific independent component sets. An example is shown for image 2771. In FIG. 12, test image 2771's top four features, in descending magnitude of correlation, are given in the middle column. The "best fit" correlation to an AMD feature is shown on the left column and the best correlation to a Stargardt feature is given on the right. The ICA produced features whose sign (+ or −) is arbitrary; only the absolute value of the cross-correlation had significance. For the test image illustrated in FIG. 12, the magnitude of the correlation coefficient to the AMD component set was larger than the correlation the corresponding feature of the Stargardt component set for each comparison. Note that by the fourth feature examined, the cross-correlation of the test image's feature with the Stargardt feature set has dropped to −0.27, which is minimally correlated. In all four cases and for each test image, every feature-by-feature correlation was larger in magnitude when comparing the test image to the correct disease component set. Once the features generated by ICA were shown, visual comparison of the test image features to the AMD and Stargardt sets supported the ICA's correlations. For example, if one visually compares the bottom three independent component images in FIG. 11, the test feature (bottom center) "looks" more like the AMD feature (bottom left) that the Stargardt feature (bottom right).

FIG. 12 provides images which exemplify the 32×32 pixel features extracted by ICA from AMD set (left column of images), a test image (center column) and Stargardt set (right column). Numbers between images show the ICA feature rank for each analysis. Correlations between corresponding ICA features are represented between 1.00/−1.00 (perfect correlation) and +/−0.00 (no correlation). Note that for every feature of the test image, the correlation is lower to the Stargardt than the AMD feature. In this example, the test image was derived from an AMD fundus photograph.

iii. Justification of ICA to Establish Phenotypic Classes within AMD

This study showed that application of ICA robustly detected and characterized features in fundus images from AMD and non-AMD retinal diseases. In addition, ICA was used to correctly classify unknown fundus images through the comparison to the feature sets of the test image and disease independent component sets.

B. Example 2

The methods and systems disclosed were used to divide the retinal images of 300 AMD patients into "phenotype" classes based on fundus features. Feature sets were mathematically-derived from the images utilizing independent component analysis (ICA). ICA produced independent components, which contained within them derivations of the image and structural relationship information. There were independent components that were uniquely associated with putative phenotypes of AMD. The independent components that provide differentiations between phenotypes were recognized by clustering the images based on the independent components that are less common to all AMD images. The clustering process was limited to allow 2-5 groups, or phenotype classes, for which subsets of the independent components are more similar than between the groups.

i. Study Population

Three hundred (300) AMD patients at least 55 years of age, without other eye disorders such as glaucoma or known ocular hereditary conditions, were selected from the outpatient clinic at the University of Iowa.

Inclusion criteria included:
Clinical diagnosis of AMD (age 55 or greater)
One macular image, ETDRS field definition 2
Non-exudative AREDS grade 3 or higher
SNP genotype available (see below)
ii. Fundus Slide Image Digitization The 300 35 mm color fundus slides for these patients had been previously digitized and stored on computer hard disks at a resolution of about ~4.5 micrometers per pixel. Field of view of these images was 30 degrees (approximately DRS, field definition 2). Scanned digital images were stored as RGB color files over the central 2500 pixel diameter area.

iii. Image Analysis Approach: Image Samples

From each fundus image, samples of sizes 16×16, 32×32, 64×64, and the like, (depending on pixel resolution of image and feature scale sizes) were collected. These were referred to as the scales of the samples. For each sample size, 300 to 600 samples per image were obtained, which may overlap, resulting in 300 (images)×300 to 600 samples per image or 90,000 to 180,000 total samples. These sample dimensions, which corresponded to approximately the size of larger drusen or small clusters of drusen, were chosen based on prior experimental data (See Example 1). FIG. 5 shows the relative dimension of a 32×32 sample with respect to the full image. Only a few, non-overlapping samples (not the full 300 to 600) are depicted.

iv. Image Analysis Approach: ICA of the Samples to Obtain Independent Components Each image sample, represented by a vector $x_i$, was assumed to be the product of a linear combination of N basis functions or independent components which are the underlying features that a visual system might use to decompose the image. Following the methods used in ICA, the basis functions become the columns of a matrix A. Deriving the independent components from a set of samples, X, was performed as follows. Let $X=[x_1(t) \ldots x_K(t)]T$ be the set of samples taken from the image. Assuming that these come from a linear combination of image 'features', called 'sources' in the ICA literature, $S=[s_1(t) \ldots s_K(t)]T$, and a linear mixing matrix, A, as Eq. 4.

Then ICA comprised estimating both A and S using only the observations X under the assumption that the source signals or components were statistically independent. The statistical independence of the sources meant that their joint probability could be factorized as Eq. 5 where $p(s_i)$ is the individual probability density function (pdf) of each of the sources and N is the number of sources. The JADE (or any other ICA) algorithm was programmed to recover the independent components of X. This algorithm calculated the ICA decomposition of X by calculating the eigenvalue decomposition of the cumulant tensor of the data. The eigenvalues of the cumulant tensor are vectors corresponding to the independent components of the mixture. The result of the redundancy reduction using JADE was a set (of size $M<=N$) of independent components $s_i$ of the same size or scale as the samples, as seen in FIG. 5. The clustering of images into presumptive or putative phenotypes according to these independent components was then performed.

v. Image Analysis Approach: Clustering the 300 Images Based on Their Independent Components Taking an image I from the 300 images, each retina pixel in the image was convolved with each of the independent components resulting from the ICA of the samples of a certain size, resulting in a vector of the independent component responses $r_j$ for all pixels j in image I. These vectors $r_j$ were then clustered using k-means clustering for cluster numbers of 2, 3, 4, 5. The number of clusters that resulted in the largest inter-group distance were taken as the correct number of clusters for the sample scale. For this, the Mahalanobis distance was used, which is based on correlations between variables by which different patterns can be identified and analyzed. It differs from Euclidean distance in that it accounts for correlations of the data set and is scale-invariant, i.e. not dependent on the scale of measurements. Thus for each sample scale, the 300 images were clustered into 2, 3, 4, and 5 clusters based on their features. These clustering thresholds also allowed receiver operating characteristic (ROC) analysis. The clusters were checked to see whether age, gender and pseudophakia status affect the clustering, and correction for confounding was performed, if necessary.

C. Example 3

The mechanistic relevance of these phenotypic classes was determined by evaluating whether the distribution of complement factor H (cfH) and HTRA-1 genotypes were specifically associated to the phenotypical classes.

Existing high-density single nucleotide polymorphism (SNP) genotypes of 300 subjects with AMD were used to assess the association of cfH and HTRA-1 genotypes to the computationally identified phenotypic classes. The association was statistically evaluated using the Chi-squared test. The distributional characteristics and deviation of cfH and HTRA-1 in the different phenotypes from the expected distribution in each population were explored using Free Response Receiver Operating Characteristics (FROC).

i. Study Population, Genotyping

The SNP genotypes for 200 of these AMD patients using Affymetrix 500K SNP arrays had been determined previously, and the genotypes for the remaining 100 patients was determined. Each array was required to have at least an 85% call rate, as recommended by Affymetrix, and most had a call rate greater than 90%. The average call rate was over 93% for all arrays run to date. This includes multiple SNPs that were within 25 kb of the CFH and HTRA1/LOC387715 AMD-associated loci. Based upon these first 200 of the 300 AMD patients and a set of 200 age-matched controls, the associations with the CFH and HTRA1 loci were clearly present in this data set. This confirmed the quality and accuracy of the genotype data.

ii. Association of Genotype With Phenotypical Classes

The genotype-phenotype assessment was performed using a similar strategy successfully employed in many previous association studies. The Chi-squared test was used to assess the significance of association between the allele frequency and the five or fewer independent components-derived phenotype classes. SNP markers within 25 kb of the CFH and HTRA1 gene were used to evaluate genetic association to those loci. To reduce the issue of multiple testing, a minimum set of independent SNPs (less than 80% correlation) was used in the analysis. Independence was assessed using the linkage disequilibrium (LD) data published by the HapMap project.

iii. Outcome Analysis

One outcome of the genotype-phenotype association analysis was a p-value as determined by the Chi-squared test. Associations with $p<0.01$ indicated that the SNP was nearby a genetic locus responsible for developing or increasing the risk of developing the associated features. FROC analysis identified alternative classes of features that were more specifically enriched for a given SNP genotype. Cases in which the FROC analysis identified a novel genotype-phenotype association were regarded as a hypothesis to be tested in additional AMD subjects.

iv. Power Calculation for Detection of an Allele Frequency Difference among Phenotypic Classes The power was calculated for detecting the allele frequency differences in sub-groups exhibiting specific sub-phenotypes of AMD. The total sample size was n=300. Several partitions of the sample were considered in groups of various sizes. The calculation was performed assuming allele frequency changes of 25% (similar to the complement factor H Y402H mutation frequency difference in AMD versus controls). After correcting for assessment at multiple loci, the predicted power of this analysis was 90% or higher for groups of at least 30 patients (10% of the total sample space). This calculation suggested that for the sample size available, the methods and systems had excellent power to detect the allele frequency differences between AMD patients and controls for a range of sample size patterns.

D. Example 4

The clinical or translational importance of the phenotypes was determined by evaluating whether retinal specialists could be taught to recognize them.

A training set of 100 images with approximately equally distributed numbers in each phenotype class was created. Intra- and inter-grader agreement was determined among three highly experienced retinal specialists who used this training set to assign the 200 remaining images into an equal number of classes using a forced-choice methodology.

i. Creation of a Training Image Set and a Testing Set

From each of the fewer than 5 clusters, an approximately equal number of images was drawn, for a total number of approximately 100 images, to have a balanced, masked training set, where the readers could not suspect that a cluster was less prevalent because there were fewer example images. The training set was selected randomly from each cluster to give the readers a sense for the variability in each cluster. The remaining 200 images were assigned to the test set.

ii. Retinal Specialist Computer Assisted Training

The retinal specialists were masked to each other, and were presented, using a specially developed computer tool, with the training images from each phenotype class. The software presented a representative image of each phenotype class for reference. The experts were presented with each image in sequence, and were then be asked to assign the image to a single phenotype cluster as defined by the examples. The phenotype clusters had a number associated with it as its identifier. Readers reviewed and classified all the images at least twice before completing the testing stage.

iii. Outcome Analysis

The (ordinal) outcome of the human expert reading was compared to the ordinal phenotype cluster for each image and reader. The task was to determine if the categories constituted valid phenotypes. Having had several raters classify each image to one of several types, a multi rater kappa statistic was used to assess the overall rater agreement. By custom, if the kappa was 0.4 or higher, the agreement was taken as good, while if the kappa is 0.8 or higher the agreement was taken as excellent. If the overall kappa showed acceptable agreement, individual classes were tested as phenotypes by testing the accuracy of classification. The accuracy of classification was tested by combining the data from all raters to compute the percentage of correct classifications. If this frequency was significantly greater than one over the number of classes (i.e. random selection), then the rater agreement was also accurate. Individual classes were tested in the same way by testing if the percentage of correct classifications for a given class of images was significantly greater than one over the number of classes.

E. Example 5

The methods and systems provided implemented ICA-based algorithms for classification of chest x-rays. The methods and systems automatically assigned opacity severity or profusion to regions identified or to a region selected by a radiograph interpreter. Opacity types and severity were characterized by computer-derived spatial features derived from their presentation in chest radiographs. The ICA-based methodology determined overall regions of interest, the level of opacity profusion utilizing the ILO 12-point rating scheme (0/1 to 3/+).

Through the adoption of the ILO classification procedures, it was envisioned that reader variation in the classification of parenchymal abnormalities would be minimized. Because the ILO classification of the pneumoconiosis is based on a structured procedure for detecting and characterizing patterns on chest radiographs, this system would limit the variations in interpretation. Numerous prior studies have shown, however, that inter- and intra-observer variability of radiograph readings by trained medical personnel has persisted. Reader variability has been reported as being a significant problem affecting classification consistency of pneumoconiotic radiographs. Inter-reader variability is well documented, as is the variability in the same reader on different occasions. A prior study involved an alternative approach which required the reader to view and assess six lung zones separately in classifying chest radiographs. This approach relieved the reader of having to integrate mentally the reading for the entire lung into a single value. Without accurate, consistent evaluation of chest x-rays from at risk workers in dust environments, the best possible healthcare and monitoring can not be attained. The methods and systems provided solve the reader variability problems currently present.

Samples of a set of images that all represent a single ILO classification and the image quality category as assigned by the radiologists based on their "grading" criteria served as visual "observations". These samples contained a set of independent components or filters that the human vision system uses to encode the information in the image. Further, some or a combination of these independent components were unique to an ILO category.

Four images from B-reader ILO standard images were selected for an experiment with the independent component analysis (ICA) methodology. FIG. 13A-D presents the four digitized x-rays that were used in this study. FIG. 13A 00, FIG. 13B 11$qq$, FIG. 13C 22$qq$, and FIG. 13D 33 $qq$. The x-rays were digitized at 12 bit depth and 96 dpi resolution. The dimension of the samples reflects the size of the features being studied. In this case the rounded opacities vary in size, but are nominally about 4-10 pixels in diameter. For this reason sample dimensions of 8×8 pixels were used. The images were all 1025 by 825 pixels, width and height, respectively. The right and left lungs were processed separately. The dimension of the right and left lung areas were extracted manually and were each 240 by 670 pixels in width and length. A total of 4800 samples were collected randomly with an even distribution from each lung and processed to produce 64 independent components (features). The size of the sample, the number of samples, and the number of images to be used as "exemplars" were variables that were determined by nature of the problem and experimentation. The number of outputs, the independent components (IC), were likewise varied. Electing to output too many ICs will not yield improved results and will only increase computational time. The optimal number of ICs were determined by studying statistically the added information provided by the higher order ICs in their application to the classification of the images. In this controlled study, the objective was to determine the sensitivity in detecting the rounded opacities without the added noise of normal anatomical features. This experiment allowed for the determination of a starting point for the number of samples that were required and the dimension of the samples needed to capture the characteristics of the disease.

FIG. 14A and FIG. 14B shows a portion of the right lung to better illustrate the differences between the stages of the disease. The expanded view shows clearly the increased number of rounded opacities as one goes from standard image 00 (FIG. 14A) to standard image 33 (FIG. 14B). Also shown in the left of the image labeled "33" in FIG. 14B is a box illustrating the size of an 8 by 8 sample that was used. The area of the lung images was 160,000 pixels. The area of 8 by 8 sample dimensions for 4800 samples is 307,200 pixels. This means that each point is statistically sampled slightly less than two times.

Figure 15A:
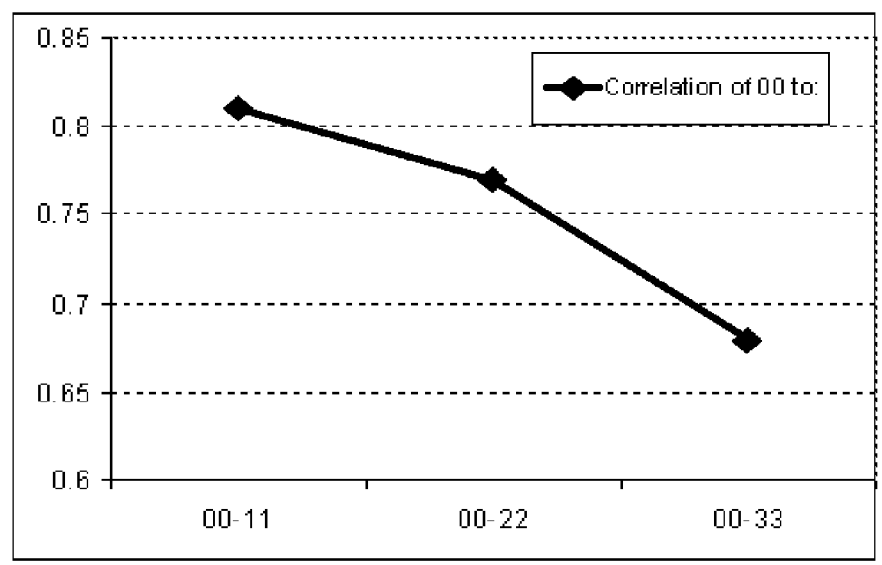
FIGS. 15A and B illustrate normalized correlations among four images and their respective ICs.
Figure 15B:
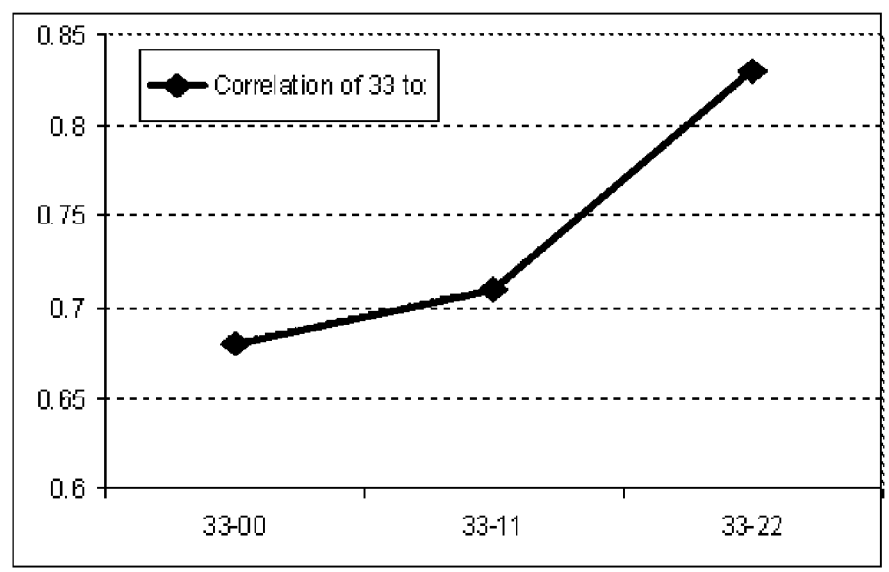

The hypothesis was that a standard image would have greater correlation to another image if the stage of the disease was closer. In other words, 00 (representing essentially no disease) and 33 (representing the greatest progression of the disease) would have the lowest correlation, while 00 and 11 would have a higher correlation. Different metrics were used to analyze the data, all of which are based on the normalized cross correlation of a set of independent components from one image with another. One can start by comparing the overall correlation of all the ICs belong to each of the two images being compared. Plotted in FIG. 15A and FIG. 15B are the normalized correlations among the four images and their respective ICs. The most important finding is that the correlation of Standard ILO image 00 follows the expected trend (FIG. 15A). It is more highly correlated to image 11 than to 33. Similarly, Standard ILO image 33 is more closely correlated to image 22 than to 11 (FIG. 15B).

The effectiveness of the ICA methodology as a means for automatically classifying chest x-rays according to the ILO Standards was established by these results. As shown in FIG. 15A, image 00 has a correlation of 0.81 with image 11 and decrease to 0.77 for the more advanced stage of the disease in image 22, and finally decreases even further to a correlation of 0.68 for the most advanced stage of pneumoconiosis presented in image 33. The converse was true when studying the correlations of image 33 with the less advanced stages of the disease presented in images 22, 11, and 00. The correlation steadily decreased from image 22 to 00.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method does not actually recite an order to be followed by its steps or it is not otherwise specifically stated in the descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made in the present methods and systems without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for determining optimal features for classifying a pattern in an image comprising:
   separating each of a first plurality of images into a plurality of channels;
   determining a set of samples from the plurality of channels;
   for each channel, performing Independent Component Analysis (ICA) on the set of samples resulting in a set of independent components;
   creating a plurality of feature sets from the set independent components; and
   selecting one of the plurality of feature sets that is optimal for classification according to a metric.

2. The method of claim 1, wherein the set of samples comprises a plurality of regions from the first plurality of images.

3. The method of claim 1, wherein the ICA uses two dimensional samples from two-dimensional channels.

4. The method of claim 1, wherein the ICA uses three dimensional samples from three-dimensional channels.

5. The method of claim 1, wherein the metric is an area under a Receiver Operating Characteristic (ROC) curve of classification, using one of the plurality of feature sets to classify a different plurality of channels.

6. The method of claim 1, wherein the metric is the accuracy of the classification, using the optimal feature set to classify a different plurality of channels.

7. The method of claim 1, further comprising:
   receiving a second plurality of images; and
   segmenting the second plurality of images into a plurality of regions according to a property by convolution with the optimal feature set.

8. The method of claim 1, wherein each sample of the set of samples, X, is represented by a vector $x_i$ and is the product of a linear combination of N basis functions, wherein the N basis functions are the underlying features that a visual system would use to compose the image.

9. The method of claim 8, wherein performing ICA comprises constructing a matrix A wherein the N basis functions are the columns of the matrix A.

10. The method of claim 9, wherein performing ICA further comprises:
    letting $X=[x_1(t)\ x_2(t)\ \ldots\ x_n(t)]$ be the set of samples;
    assuming the set of samples came from a mixture $S=[s_1(t)\ s_2(t)\ \ldots\ s_n(t)]$ and the matrix A, as in X=AS; and
    estimating both A and S using X.

11. The method of claim 1, wherein the plurality of channels comprises red, green, and blue.

12. The method of claim 1, wherein the plurality of channels comprises a vectorial representation of multichannel data.

13. The method of claim 1, wherein the plurality of channels comprises color opponency channels as in a mammalian visual cortex.

14. The method of claim 1, wherein the plurality of channels comprises hue, saturation, brightness channels.

15. The method of claim 1, further comprising representing the resulting optimal feature set by an intensity image array.

16. The method of claim 1, further comprising outputting a visual representation of the optimal feature set.

17. The method of claim 1, wherein the optimal feature set is spatially invariant.

18. A method for image analysis comprising:
- classifying each image in a set of images into images belonging to a first class and images belonging to a second class;
- separating each of the images into a plurality of channels;
- determining a set of samples from the plurality of channels; and
- for each channel, performing an Independent Component Analysis (ICA) on the set of samples resulting in a set of independent components, wherein the set of independent components represent optimal features for classifying a new image as belonging to the first class or the second class.

19. The method of claim 18, wherein classifying each image in a set of images into images belonging to a first class and images belonging to a second class comprises classifying pixels of each image into pixels belonging to the first class and pixels belonging to the second class.

20. The method of claim 18, wherein the first class is one of vessels, bone, or tumor tissue and the second class is one of nerve tissue, soft tissue, or healthy tissue.

21. The method of claim 18, further comprising determining the probability that the new image belongs to the first or second class.

22. A system for determining optimal features for classifying a pattern in an image comprising:
- a memory; and
- a processor configured for performing steps comprising,
  - separating each of a first plurality of images into a plurality of channels;
  - determining a set of samples from the plurality of channels;
  - for each channel, performing Independent Component Analysis (ICA) on the set of samples resulting in a set of independent components;
  - creating a plurality of feature sets from the set independent components; and
  - selecting one of the plurality of feature sets that is optimal for classification according to a metric.

23. The system of claim 22, wherein the set of samples comprises a plurality of regions from the first plurality of images.

24. The system of claim 22, wherein the ICA uses two dimensional samples from two-dimensional channels.

25. The system of claim 22, wherein the ICA uses three dimensional samples from three-dimensional channels.

26. The system of claim 22, wherein the metric is an area under a Receiver Operating Characteristic (ROC) curve of classification, using one of the plurality of feature sets to classify a different plurality of channels.

27. The system of claim 22, wherein the metric is the accuracy of the classification, using the optimal feature set to classify a different plurality of channels.

28. The system of claim 22, further comprising:
- receiving a second plurality of images; and
- segmenting the second plurality of images into a plurality of regions according to a property by convolution with the optimal feature set.

29. The system of claim 22, wherein each sample of the set of samples, X, is represented by a vector $x_i$ and is the product of a linear combination of N basis functions, wherein the N basis functions are the underlying features that a visual system would use to compose the image.

30. The system of claim 29, wherein performing ICA comprises constructing a matrix A wherein the N basis functions are the columns of the matrix A.

31. The system of claim 30, wherein performing ICA further comprises:
- letting $X=[x_1(t)\ x_2(t)\ \ldots\ x_n(t)]$ be the set of samples;
- assuming the set of samples came from a mixture $S=[s_1(t)\ s_2(t)\ \ldots\ s_n(t)]$ and the matrix A, as in $X=AS$; and
- estimating both A and S using X.

32. The system of claim 22, wherein the plurality of channels comprises red, green, and blue.

33. The system of claim 22, wherein the plurality of channels comprises a vectorial representation of multichannel data.

34. The system of claim 22, wherein the plurality of channels comprises color opponency channels as in a mammalian visual cortex.

35. The system of claim 22, wherein the plurality of channels comprises hue, saturation, brightness channels.

36. The system of claim 22, further comprising representing the resulting optimal feature set by an intensity image array.

37. The system of claim 22, further comprising outputting a visual representation of the optimal feature set.

38. The system of claim 22, wherein the optimal feature set is spatially invariant.

39. A non-transitory computer readable medium with computer executable instructions embodied thereon for determining optimal features for classifying a pattern in an image comprising:
- separating each of a first plurality of images into a plurality of channels;
- determining a set of samples from the plurality of channels;
- for each channel, performing Independent Component Analysis (ICA) on the set of samples resulting in a set of independent components;
- creating a plurality of feature sets from the set independent components; and
- selecting one of the plurality of feature sets that is optimal for classification according to a metric.

40. The non-transitory computer readable medium of claim 39, wherein the set of samples comprises a plurality of regions from the first plurality of images.

41. The non-transitory computer readable medium of claim 39, wherein the ICA uses two dimensional samples from two-dimensional channels.

42. The non-transitory computer readable medium of claim 39, wherein the ICA uses three dimensional samples from three-dimensional channels.

43. The non-transitory computer readable medium of claim 39, wherein the metric is an area under a Receiver Operating Characteristic (ROC) curve of classification, using one of the plurality of feature sets to classify a different plurality of channels.

44. The non-transitory computer readable medium of claim 39, wherein the metric is the accuracy of the classification, using the optimal feature set to classify a different plurality of channels.

45. The non-transitory computer readable medium of claim 39, further comprising:
- receiving a second plurality of images; and
- segmenting the second plurality of images into a plurality of regions according to a property by convolution with the optimal feature set.

46. The non-transitory computer readable medium of claim 39, wherein each sample of the set of samples, X, is represented by a vector $x_i$ and is the product of a linear combination of N basis functions, wherein the N basis functions are the underlying features that a visual system would use to compose the image.

47. The non-transitory computer readable medium of claim 46, wherein performing ICA comprises constructing a matrix A wherein the N basis functions are the columns of the matrix A.

48. The non-transitory computer readable medium of claim 47, wherein performing ICA further comprises:
letting $X=[x_1(t) \ x_2(t) \ldots x_n(t)]$ be the set of samples;
assuming the set of samples came from a mixture $S=[s_1(t) \ s_2(t) \ldots s_n(t)]$ and the matrix A, as in X=AS; and
estimating both A and S using X.

49. The non-transitory computer readable medium of claim 39, wherein the plurality of channels comprises red, green, and blue.

50. The non-transitory computer readable medium of claim 39, wherein the plurality of channels comprises a vectorial representation of multichannel data.

51. The non-transitory computer readable medium of claim 39, wherein the plurality of channels comprises color opponency channels as in a mammalian visual cortex.

52. The non-transitory computer readable medium of claim 39, wherein the plurality of channels comprises hue, saturation, brightness channels.

53. The non-transitory computer readable medium of claim 39, further comprising representing the resulting optimal feature set by an intensity image array.

54. The non-transitory computer readable medium of claim 39, further comprising outputting a visual representation of the optimal feature set.

55. The non-transitory computer readable medium of claim 39, wherein the optimal feature set is spatially invariant.

56. A system for image analysis comprising:
a memory; and
a processor, configured for performing the steps comprising,
classifying each image in a set of images into images belonging to a first class and images belonging to a second class;
separating each of the images into a plurality of channels;
determining a set of samples from the plurality of channels; and
for each channel, performing an Independent Component Analysis (ICA) on the set of samples resulting in a set of independent components, wherein the set of independent components represent optimal features for classifying a new image as belonging to the first class or the second class.

57. The system of claim 56, wherein classifying each image in a set of images into images belonging to a first class and images belonging to a second class comprises classifying pixels of each image into pixels belonging to the first class and pixels belonging to the second class.

58. The system of claim 56, wherein the first class is one of vessels, bone, or tumor tissue and the second class is one of nerve tissue, soft tissue, or healthy tissue.

59. The system of claim 56, further comprising determining the probability that the new image belongs to the first or second class.

60. A non-transitory computer readable medium with computer executable instructions embodied thereon for image analysis comprising:
classifying each image in a set of images into images belonging to a first class and images belonging to a second class;
separating each of the images into a plurality of channels;
determining a set of samples from the plurality of channels; and
for each channel, performing an Independent Component Analysis (ICA) on the set of samples resulting in a set of independent components, wherein the set of independent components represent optimal features for classifying a new image as belonging to the first class or the second class.

61. The non-transitory computer readable medium of claim 60, wherein classifying each image in a set of images into images belonging to a first class and images belonging to a second class comprises classifying pixels of each image into pixels belonging to the first class and pixels belonging to the second class.

62. The non-transitory computer readable medium of claim 60, wherein the first class is one of vessels, bone, or tumor tissue and the second class is one of nerve tissue, soft tissue, or healthy tissue.

63. The non-transitory computer readable medium of claim 60, further comprising determining the probability that the new image belongs to the first or second class.

* * * * *